US011845104B1

(12) United States Patent
Altaras et al.

(10) Patent No.: US 11,845,104 B1
(45) Date of Patent: Dec. 19, 2023

(54) LIQUID SOLUTION TWIST PEN METHOD AND DEVICES

(71) Applicants: Eli Altaras, Covina, CA (US); Yusuf Altaras, Covina, CA (US)

(72) Inventors: Eli Altaras, Covina, CA (US); Yusuf Altaras, Covina, CA (US)

( * ) Notice: Subject to any disclaimer, the term of this patent is extended or adjusted under 35 U.S.C. 154(b) by 0 days.

(21) Appl. No.: 18/105,836

(22) Filed: Feb. 4, 2023

(51) Int. Cl.
- *B05C 5/02* (2006.01)
- *B05C 11/02* (2006.01)
- *B05C 17/00* (2006.01)
- *B05C 21/00* (2006.01)
- *B05C 17/005* (2006.01)

(52) U.S. Cl.
CPC ...... *B05C 17/00506* (2013.01); *B05C 5/0225* (2013.01); *B05C 11/023* (2013.01); *B05C 17/0052* (2013.01); *B05C 21/00* (2013.01)

(58) Field of Classification Search
None
See application file for complete search history.

(56) References Cited

U.S. PATENT DOCUMENTS

| | | | | |
|---|---|---|---|---|
| 772,345 | A * | 10/1904 | Emery | F41A 13/04 89/20.2 |
| 1,214,310 | A * | 1/1917 | Josselyn | B43K 5/04 401/166 |
| RE14,397 | E * | 11/1917 | Josselyn | 401/166 |
| 1,465,845 | A * | 8/1923 | Evans | B43K 5/1845 401/260 |
| 1,727,110 | A * | 9/1929 | Lecroy | B43K 8/003 401/35 |
| 2,070,206 | A * | 2/1937 | Hudson | B41F 31/08 401/172 |
| 2,156,112 | A * | 4/1939 | Dykema | B01L 3/0282 422/934 |
| 2,258,841 | A * | 10/1941 | Biro | B43K 1/08 401/214 |
| 2,396,058 | A * | 3/1946 | Rath | B43K 8/026 401/198 |
| 2,775,502 | A * | 12/1956 | Sykora | G01D 15/18 346/49 |
| 3,167,803 | A * | 2/1965 | Shimamura | B43K 8/06 401/199 |
| 3,856,420 | A * | 12/1974 | Oltmann | B43K 7/00 401/109 |
| 3,951,555 | A * | 4/1976 | Wittnebert | B43K 8/04 401/209 |
| 4,098,276 | A * | 7/1978 | Bloom | A61M 5/1782 604/207 |
| 4,318,626 | A * | 3/1982 | Bok | B43K 7/10 401/151 |

(Continued)

*Primary Examiner* — Jethro M. Pence
(74) *Attorney, Agent, or Firm* — Edmond DeFrank

(57) ABSTRACT

The embodiments disclose an apparatus including a dispenser having an elongated compartment configured to contain a liquid solution, a liquid solution contained in the elongated compartment configured to suspend solid nanoparticles in an evaporative liquid, a dispenser handle configured to twist to push a predetermined amount of the liquid solution from the elongated compartment out of an open tip orifice, and at least one applicator tip insertable into the tip orifice configured to receive from the elongated compartment the predetermined amount of the liquid solution to spread over a user's mobile device glass screen.

4 Claims, 18 Drawing Sheets

(56) References Cited

U.S. PATENT DOCUMENTS

| | | | | | |
|---|---|---|---|---|---|
| 4,624,594 | A | * | 11/1986 | Sasaki | G01F 11/08 401/172 |
| 4,733,586 | A | * | 3/1988 | Manusch | B43K 15/02 29/415 |
| 5,626,431 | A | * | 5/1997 | Hetzer | B43L 25/008 401/199 |
| 5,813,787 | A | * | 9/1998 | Dowzall | B43K 27/08 401/199 |
| 5,955,719 | A | * | 9/1999 | Southworth | G06K 7/10881 235/455 |
| 6,202,862 | B1 | * | 3/2001 | Acquaviva | B43K 21/003 211/69.5 |
| 6,213,398 | B1 | * | 4/2001 | Southworth | G06K 7/10881 235/472.03 |
| 6,227,741 | B1 | * | 5/2001 | Quercioli | B43K 8/06 401/199 |
| 6,238,057 | B1 | * | 5/2001 | Chen | B43K 29/10 362/101 |
| 6,270,274 | B1 | * | 8/2001 | Chao | A45C 11/04 401/52 |
| 6,406,204 | B1 | * | 6/2002 | Omatsu | C09D 11/18 401/141 |
| 6,563,493 | B2 | * | 5/2003 | Kobayashi | G06F 3/03545 345/173 |
| 6,837,640 | B2 | * | 1/2005 | Kobayashi | B43K 1/08 401/214 |
| 6,882,340 | B2 | * | 4/2005 | Kanzaki | G06F 3/03545 178/19.04 |
| 6,893,179 | B2 | * | 5/2005 | Kageyama | B43L 19/0068 401/32 |
| 7,597,496 | B2 | * | 10/2009 | Dubinski | B43K 29/00 401/23 |
| 7,600,938 | B2 | * | 10/2009 | Kobayashi | C09D 10/00 401/214 |
| 7,726,520 | B2 | * | 6/2010 | Harrold | B05B 11/1015 222/386 |
| 7,850,385 | B2 | * | 12/2010 | Noguchi | B43K 5/18 401/45 |
| 8,430,059 | B2 | * | 4/2013 | Mickley | G05B 19/25 118/410 |
| 8,794,858 | B2 | * | 8/2014 | Kirk, III | B05B 11/048 401/133 |
| 8,830,212 | B2 | * | 9/2014 | Vaganov | G06F 3/03546 345/158 |
| 8,847,930 | B2 | * | 9/2014 | Boyd | B43K 7/02 345/179 |
| 8,985,394 | B1 | * | 3/2015 | Tapocik | A61C 5/64 222/325 |
| 9,256,302 | B2 | * | 2/2016 | Chang | B43K 29/00 |
| 9,321,296 | B2 | * | 4/2016 | Dong | B43K 15/02 |
| 9,327,545 | B2 | * | 5/2016 | Tarlow | B43K 23/008 |
| 9,333,447 | B2 | * | 5/2016 | McKay | B01D 33/0158 |
| 9,342,162 | B2 | * | 5/2016 | Song | G06F 3/04883 |
| 9,365,732 | B2 | * | 6/2016 | Otsubo | C08K 3/04 |
| 9,862,225 | B2 | * | 1/2018 | Kageyama | B43K 8/04 |
| 10,306,969 | B1 | * | 6/2019 | Laaly | B43K 8/04 |
| 10,321,976 | B2 | * | 6/2019 | Reyes | A61C 5/62 |
| 10,329,075 | B2 | * | 6/2019 | Gershoni | A61J 1/00 |
| 10,532,376 | B2 | * | 1/2020 | Zhang | B05C 17/0133 |
| 10,773,028 | B2 | * | 9/2020 | Keenan | A61J 7/0046 |
| 10,988,368 | B2 | * | 4/2021 | Biel | B05B 11/0044 |
| 11,150,750 | B2 | * | 10/2021 | Tanaka | G06F 3/03545 |
| 11,540,613 | B2 | * | 1/2023 | Laaly | A45D 34/042 |
| 2008/0274066 | A1 | * | 11/2008 | Montgomery | A61C 19/06 424/53 |
| 2009/0060624 | A1 | * | 3/2009 | Schenck | A61C 5/62 401/171 |
| 2009/0227943 | A1 | * | 9/2009 | Schultz | A61J 7/0023 604/77 |
| 2012/0027501 | A1 | * | 2/2012 | Huang | A46B 7/026 401/268 |
| 2014/0030004 | A1 | * | 1/2014 | Nakamura | B05C 17/012 401/176 |
| 2014/0192029 | A1 | * | 7/2014 | Heo | G06F 3/03545 345/179 |
| 2014/0224680 | A1 | * | 8/2014 | Folger | A61P 9/04 206/232 |
| 2015/0027484 | A1 | * | 1/2015 | Narbut | A61K 8/19 132/313 |
| 2015/0164201 | A1 | * | 6/2015 | Nakamura | B05C 17/00596 401/176 |
| 2019/0031407 | A1 | * | 1/2019 | Biel | B65D 71/502 |
| 2020/0129743 | A1 | * | 4/2020 | Perez | G01F 13/00 |
| 2021/0130972 | A1 | * | 5/2021 | Behringer | C25D 17/14 |
| 2021/0190566 | A1 | * | 6/2021 | Kottu | A61M 31/00 |
| 2022/0234063 | A1 | * | 7/2022 | Gibboney | B05B 11/1077 |
| 2023/0069394 | A1 | * | 3/2023 | Romero | G09B 19/24 |

* cited by examiner

LIQUID SOLUTION TWIST PEN METHOD AND DEVICES

BACKGROUND

Users are becoming aware of the protection that is available to prevent incidental and major damage to their mobile devices. Communications and data have grown as reflected in the popularity of mobile device usage. Additionally, the cost of mobile devices has risen and the cost of repairing damaged mobile devices has kept pace with the cost increases. Many users have difficulties in applying the protection products available. What is needed is a product that provides mobile device protection with simple application steps.

DETAILED DESCRIPTION OF THE INVENTION

In the following description, reference is made to the accompanying drawings, which form a part hereof, and which are shown by way of illustration a specific example in which the invention may be practiced. It is to be understood that other embodiments may be utilized and structural changes may be made without departing from the scope of the present invention.

General Overview:

It should be noted that the descriptions that follow, for example, in terms of a liquid solution twist pen method and devices are described for illustrative purposes and the underlying system can apply to any number and multiple types of application tips. In one embodiment of the present invention, the liquid solution twist pen method and devices can be configured using a liquid solution. The liquid solution twist pen method and devices can be configured to include a brush tip and can be configured to include a sponge tip using the present invention.

The term "liquid solution" as used herein is a combination of a liquid component including, water, different types of alcohol, and other liquids when mixed with solids including nanoparticles of for example silicon dioxide ($SiO_2$) also referred to as liquid glass, and titanium dioxide ($TiO_2$), Silver (AG),), wherein the liquid solution can be any group of solid nanoparticles suspended in a fast evaporating liquid including, for example, ethanol and other elements. The terms may be used in their natural state without limiting the liquid solution to only that particular nanoparticle group and fast-evaporating liquid.

The terms "liquid solution elongated chamber" and "liquid solution holding elongated compartment" used herein are interchangeable without any change in meaning.

Figure 1:
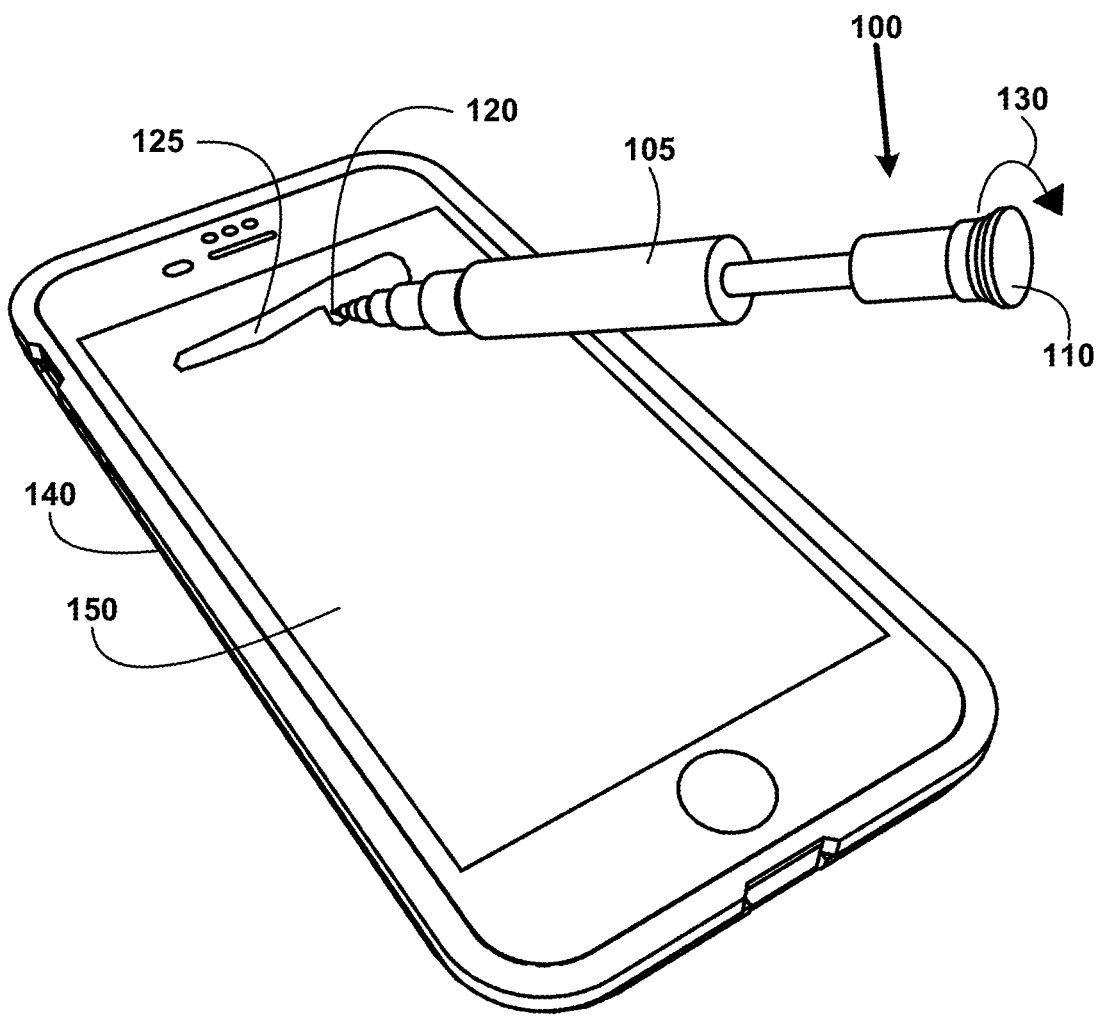
FIG. 1 shows for illustrative purposes only an example of an overview of a twist pen applying a liquid solution protective liquid to a mobile device glass screen of one embodiment

FIG. 1 shows for illustrative purposes only an example of an overview of a twist pen applying a liquid solution protective liquid to a mobile device glass screen of one embodiment. FIG. 1 shows a liquid solution twist pen 100 having a liquid solution elongated chamber with a liquid solution inside the twist pen 105. A twist-turning handle 110 is coupled to the liquid solution elongated chamber. In one embodiment the twist-turning handle 110 when turned applies pressure to the liquid solution inside the liquid solution elongated chamber. The pressure creates a flow of a predetermined volume of the liquid solution to flow into a liquid solution application tip 120. In yet another embodiment the twist-turning handle 110 is configured to a click-to-dispense method, wherein the user pushes the twist-turning handle 110 to click a liquid solution release device to dispense the liquid solution into a tip or on the surface of the mobile device's glass screen.

In another embodiment, the liquid solution fluid flows from the liquid solution elongated chamber to the tip with gravity causing the flow of the liquid solution when the twist pen is tilted with the tip in a downward direction towards the glass screen. In yet another embodiment the liquid solution elongated chamber portion of the twist pen is made of a flexible material. The liquid solution elongated chamber's flexible material allows the user to squeeze the liquid solution elongated chamber to cause pressure within the liquid solution elongated chamber to force the flow of the liquid solution towards and to the tip for application onto the glass screen.

The liquid solution application tip 120 deposits the liquid solution onto a mobile device glass screen. FIG. 1 shows the liquid solution is applied with the application tip 125 after the deposition of the predetermined amount of the liquid solution. The user is twisting the twist-turning handle to deposit more of the liquid solution 130 onto the user's mobile device 140 to create a screen protector on the user's mobile device glass screen 150 of one embodiment.

DETAILED DESCRIPTION

Figure 2:
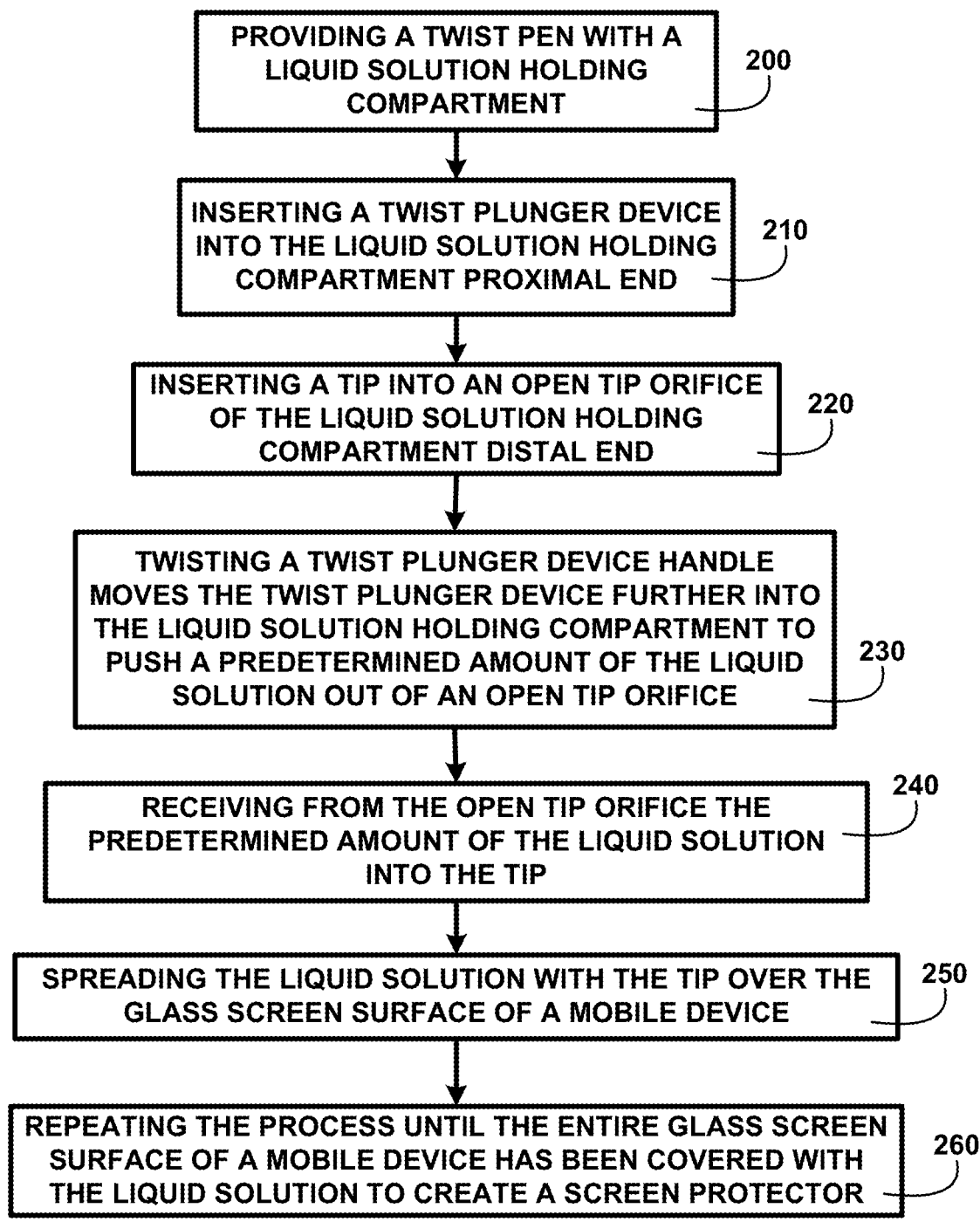
FIG. 2 shows a block diagram of an overview flow chart of the twist pen application steps of one embodiment.

FIG. 2 shows a block diagram of an overview flow chart of a twist pen application step of one embodiment. FIG. 2 shows providing a twist pen with a liquid solution holding elongated compartment 200. Inserting a twist device into the liquid solution holding elongated compartment proximal end 210. The twist pen includes inserting a tip into an open tip orifice of the liquid solution holding elongated compartment distal end 220. Twisting the twist device handle applies pressure to the liquid solution holding elongated compartment to push a predetermined amount of the liquid solution out of an open tip orifice 230.

The liquid solution flow is produced for receiving from the open tip orifice the predetermined amount of the liquid solution into the tip 240. Providing a protective layer by spreading the liquid solution with the tip over the glass screen surface of a mobile device 250. Complete the process by repeating the process until the entire glass screen surface of a mobile device has been covered with the liquid solution to create a screen protector 260 of one embodiment.

Figure 3:
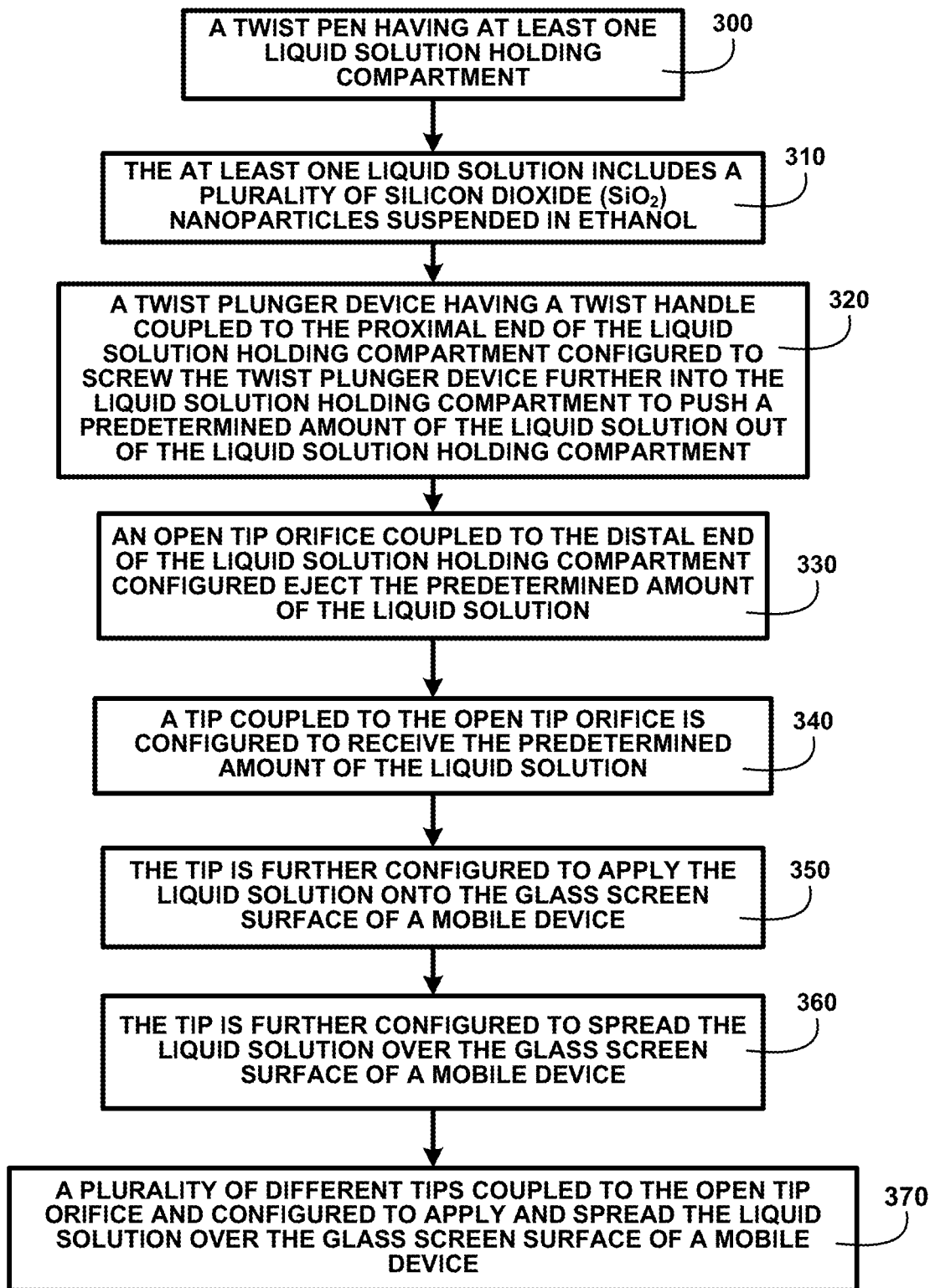
FIG. 3 shows a block diagram of an overview of the twist pen components of one embodiment.

The Twist Pen Components:

FIG. 3 shows a block diagram of an overview of the twist pen components of one embodiment. FIG. 3 shows a twist pen having a liquid solution holding elongated compartment 300 containing a predetermined volume of a liquid solution. In one embodiment the liquid solution is a plurality of silicon dioxide ($SiO_2$) nanoparticles suspended in ethanol 310 and is also referred to as liquid glass. Silicon dioxide ($SiO_2$), also known as silica, is a natural compound made of two of the earth's most abundant materials: silicon (Si) and oxygen ($O_2$). Silicon dioxide ($SiO_2$) nanoparticles are solids. In other embodiments the liquid solution is at least one of a group and is a combination of $SiO_2$ and a plurality of titanium dioxide ($TiO_2$); a combination of $SiO_2$, Water, and nanoparticles suspended in ethanol 310 and are also referred to as a liquid solution.

In one embodiment the liquid component of the liquid solution is Ethanol, Other oils, and combinations for oleophobic properties; a combination of $SiO_2$, $TiO_2$, Ethanol, and other elements; a combination of $SiO_2$, ethanol, and water; a combination of $TiO_2$, Ethanol, and Water; a combination of $SiO_2$, $TiO_2$, water, and oils; or a combination of $SiO_2$, $TiO_2$, Silver (AG), and other elements.

In one embodiment the SiO2 solution is durable and transparent and forms a screen glass protector that bonds to the glass of a mobile device with enhanced scratch, moisture, and impact resistance. Silica dioxide (SiO2) is microscopic particles of glass suspended in a liquid solution. The SiO2 solution microscopic particles fill in the imperfections of the screen and form an additional layer of glass. The SiO2 solution coating increases the hardness of the glass screen, is fingerprint resistant, and fills-in imperfections to smooth the glass surface. A glass surface of a device is not smooth. The surface has microscopic valleys and ridges that can become points of weakness when exposed to external stress. When the SiO2 solution is applied, the glass particles in the SiO2 solution bond to the device's screen and fills-in the microscopic gaps while adding a very thin layer of protection over the screen. The glass particles in the SiO2 solution coating smooth the glass and significantly reduces the points of weakness. As a result, the hardness of the coated glass increases and results in a stronger screen.

A SiO2 solution kit includes a cleaning wipe, a microfiber cloth, a nano-glass coating wipe, and instructions. The instructions include a pre-cleaning device screen step. The user will thoroughly clean all glass surfaces with the cleaner supplied in sachet 1. Remove all traces of adhesive residue from any previously applied screen protector and allow the device screen to fully dry. Removing all traces of the cleaner is done by buffing the glass thoroughly with the microfiber cloth supplied.

Any adhesive residue or cleaner trace left on the glass surface will adversely affect the ability of SiO2 particles to bond to the glass. The next process step is applying the liquid glass to the mobile device glass screen and allowing maximum drying and bonding time. The user may also apply the coating to the back of the device, the next day. In one embodiment using a circular motion when applying the SiO2 solution to the glass surface using the coating wipe supplied in sachet 2. The SiO2 solution is applied to the complete screen surface and edges. The user will allow the glass surface to cure for at least 30 minutes. When dry a residue may be visible on the glass. Once fully dry, removing any excess residue is done with the microfiber towel supplied.

Ethanol is a colorless liquid alcohol that is produced by the natural fermentation of sugars. Ethanol evaporates almost five times as fast as water. The twist pen is used to deposit in one embodiment the plurality of silicon dioxide ($SiO_2$) nanoparticles suspended in ethanol and spread the liquid solution over the user's mobile device glass screen. The ethanol evaporates quickly covering the mobile device's glass screen with a layer of the plurality of silicon dioxide ($SiO_2$) nanoparticles. In another embodiment, the twist pen includes a blue light powered with a battery that can be rechargeable and configured to cure the liquid solution applied.

In yet another embodiment the body of the pen could be covered with a cloth such as microfiber or other that will be used to buff the protective liquid after it dries. In one embodiment the twist-turning handle 110 of FIG. 1 is motorized and covered with a soft tip made of various materials including sponge, microfiber, and other materials that will be used to rotate to buff the screen. In another embodiment, the twist pen has two reservoirs. One reservoir will dispense a cleaning agent to clean the screen before the application and the other reservoir will dispense the liquid solution. The two fluids could come from the same tip or it could be two ended pen with one tip on each end wherein the tip can be reversed to apply each fluid separately.

Common glass contains about 70-72 weight % of silicon dioxide ($SiO_2$). The addition of 100% silicon dioxide ($SiO_2$) nanoparticles to the surface of the mobile device glass screen create a harder surface that is more resistant to scratching and breaking. In other embodiments, the suspension liquids are different types of alcohol or other liquids including liquids that may be proprietary and trade secrets.

A twist device having a twist handle coupled to the proximal end of the liquid solution holding elongated compartment is configured to push a predetermined amount of the liquid solution out of the liquid solution holding elongated compartment 320. An open tip orifice coupled to the distal end of the liquid solution holding elongated compartment is configured to eject the predetermined amount of the liquid solution 330 into a tip device.

A tip coupled to the open tip orifice is configured to receive the predetermined amount of the liquid solution 340. The tip is further configured to apply the liquid solution onto the glass screen surface of a mobile device 350. The tip is further configured to spread the liquid solution with the tip over the glass screen surface of a mobile device 360. A plurality of different tips are coupled to the open tip orifice and configured to apply and spread the liquid solution over the glass screen surface of a mobile device 370 of one embodiment.

Figure 4:
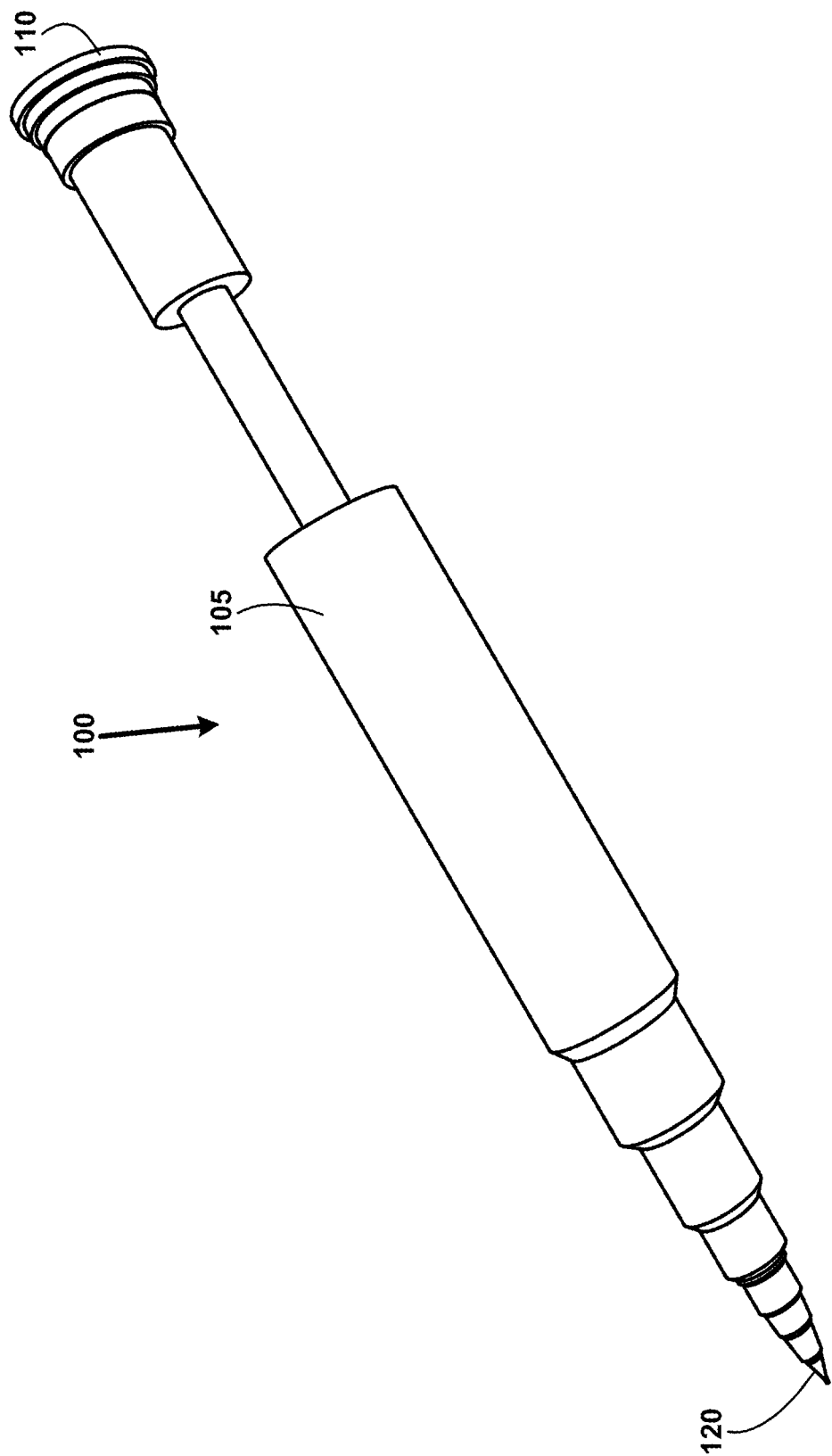
FIG. 4 shows for illustrative purposes only an example of the twist pen of one embodiment.

The Twist Pen:

FIG. 4 shows for illustrative purposes only an example of the twist pen of one embodiment. FIG. 4 shows a liquid solution twist pen 100 having a liquid solution elongated chamber with the liquid solution inside the twist pen 105. A twist-turning handle 110 when twisted applies pressure to the liquid solution within the liquid solution elongated chamber. The applied pressure forces a predetermined amount of liquid solution through an opening at the far end of the twist pen. The predetermined amount of the liquid solution is received by a liquid solution application tip 120. The liquid solution application tip 120 deposits the liquid solution onto a mobile device glass screen and then is used to spread the solution over the glass screen.

The process to twist the twist-turning handle 110 expels a predetermined amount of the liquid solution into the liquid solution application tip 120 to deposit and spread the solution onto the glass screen is repeated until the entire glass screen has been covered. The liquid solution covering dries and creates a screen protector for the mobile device of one embodiment.

Figure 5:
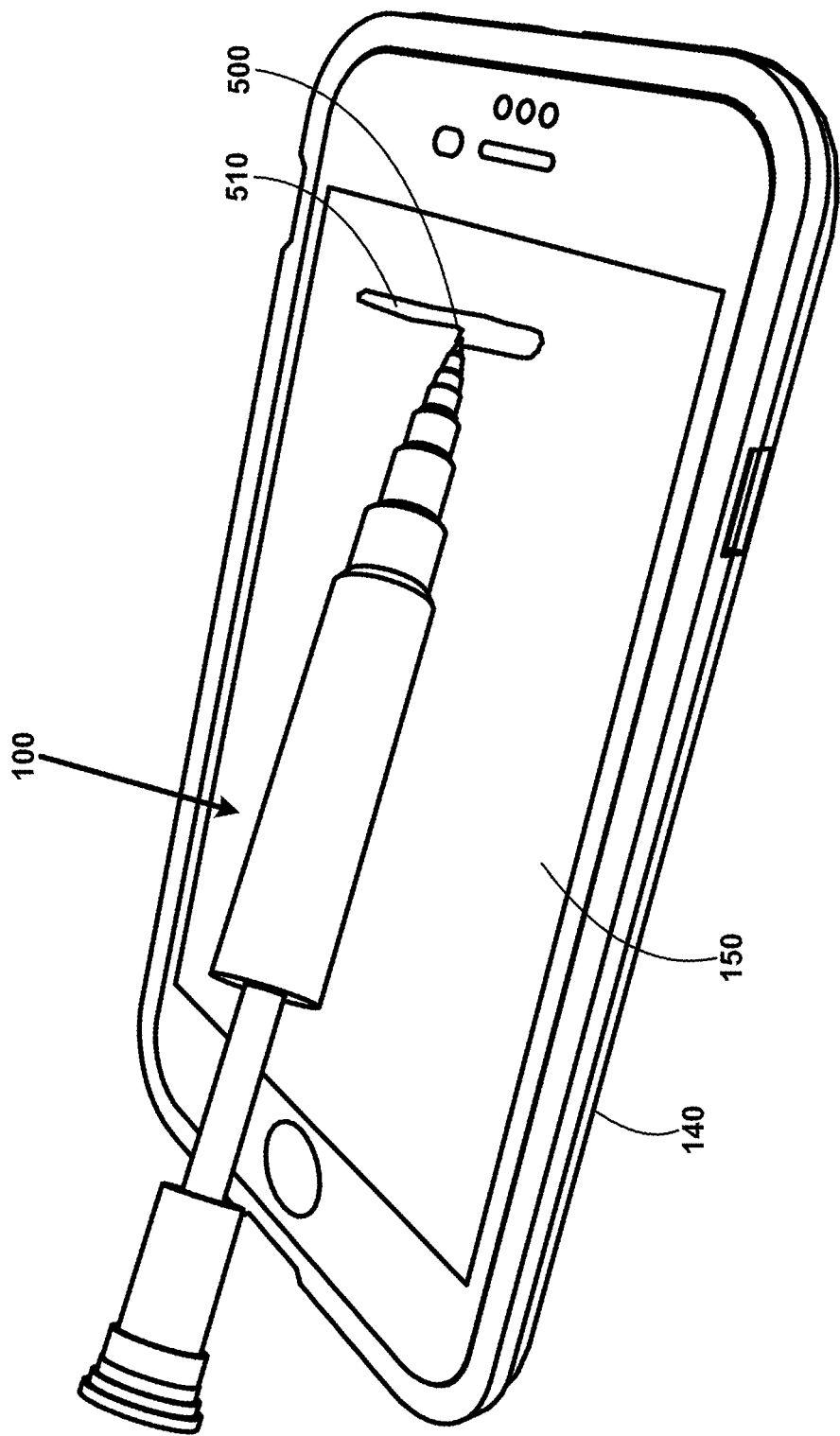
FIG. 5 shows for illustrative purposes only an example of a twist pen brush tip applying the protective liquid of one embodiment.

Twist Pen Brush Tip Application:

FIG. 5 shows for illustrative purposes only an example of a twist pen brush tip applying the protective liquid of one embodiment. FIG. 5 shows a liquid solution twist pen 100 used to apply a protective layer on the user's mobile device 140. The liquid solution twist pen 100 applies a layer of the liquid solution onto the user's mobile device glass screen 150. A brush tip 500 coupled to the liquid solution twist pen 100 deposits the liquid solution onto the screen. After depositing the liquid solution, the brush tip is used to spread the liquid solution onto the glass screen 510. Repeating the deposition and spreading of the liquid solution until the liquid solution is overlaid over the entire glass screen surface of one embodiment.

Figure 6A:
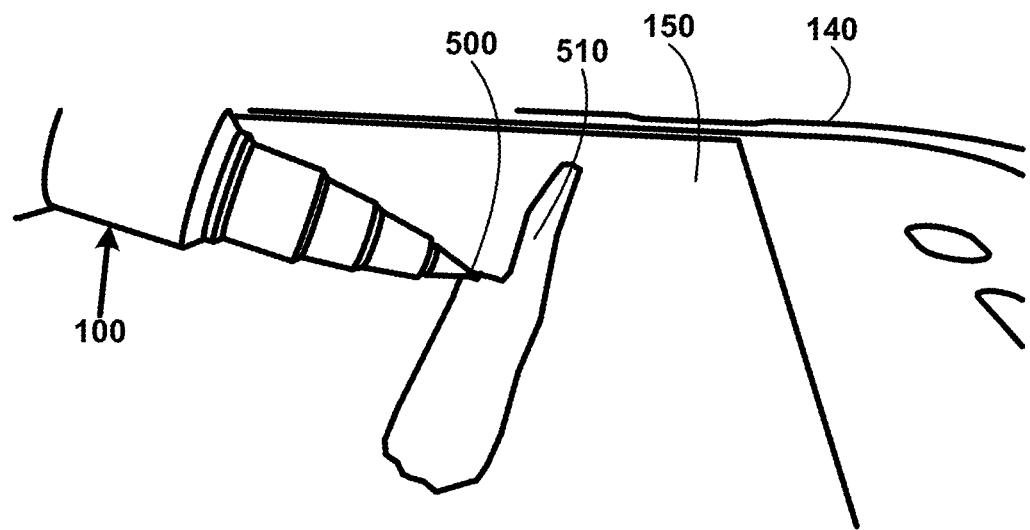
FIG. 6A shows for illustrative purposes only an example of a close-up of the twist pen brush tip applying the protective liquid of one embodiment.

A Close-Up of the Twist Pen Brush Tip Applying the Protective Liquid:

FIG. 6A shows for illustrative purposes only an example of a close-up of the twist pen brush tip applying the protective liquid of one embodiment. FIG. 6A shows the liquid solution twist pen 100 employed by a user to protect the user's mobile device 140. The user's mobile device glass screen 150 is protected with the brush tip 500 depositions of the liquid solution and the brush tip spreading liquid solution onto the glass screen 510. The liquid solution upon drying deposits a layer of the liquid solution plurality of nanoparticles onto the glass screen to build a harder more scratch-resistant layer to prevent damage of one embodiment.

Figure 6B:
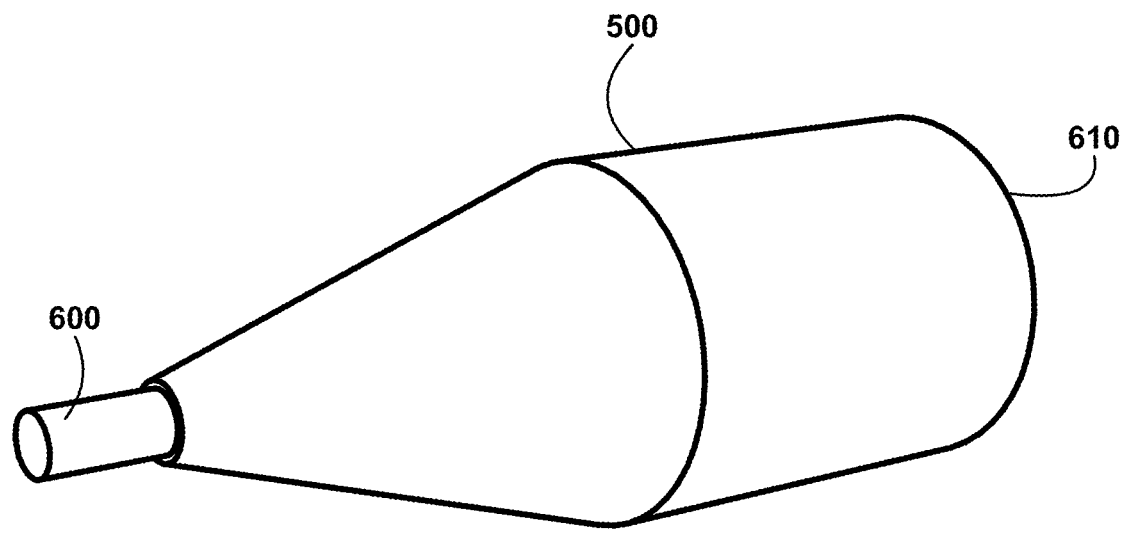
FIG. 6B shows for illustrative purposes only an example of the twist pin brush tip of one embodiment.

The Twist Pin Brush Tip:

FIG. 6B shows for illustrative purposes only an example of the twist pin brush tip of one embodiment. FIG. 6B shows the brush tip 500 including a brush 600 inserted into an insertable tip base 610 for coupling to the open tip orifice of one embodiment.

Figure 7:
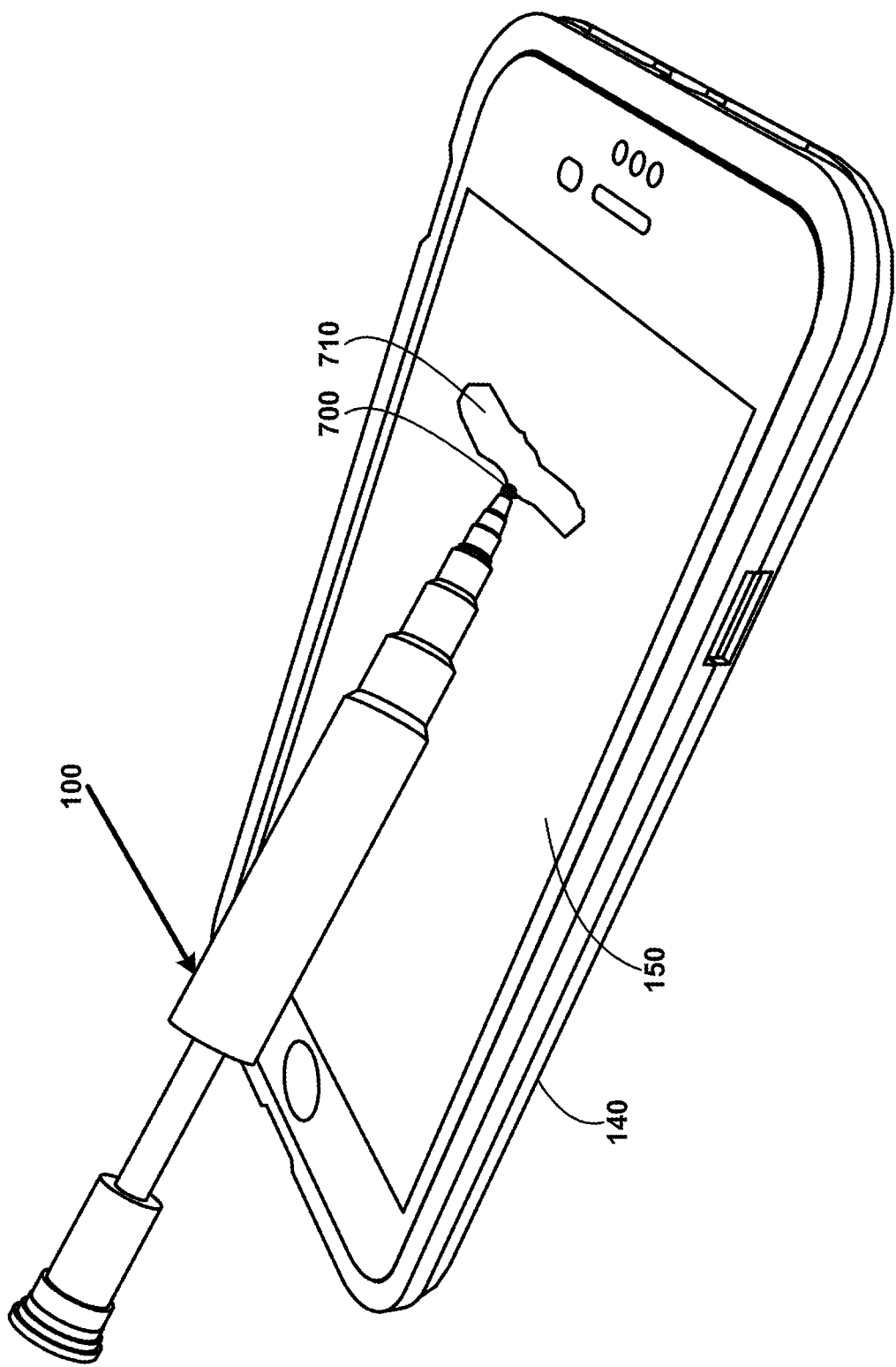
FIG. 7 shows for illustrative purposes only an example of a twist pen sponge tip applying the protective liquid of one embodiment.

A Twist Pen Sponge Tip Applying the Protective Liquid:

FIG. 7 shows for illustrative purposes only an example of a twist pen sponge tip applying the protective liquid of one embodiment. FIG. 7 shows the liquid solution twist pen 100 having a removable sponge tip 700. The user's mobile device glass screen 150 of the user's mobile device 140 is protected with the application of a liquid solution being applied over the entire surface using the sponge tip to spread the liquid solution onto the glass screen 710. The liquid solution is flowed to the sponge tip by twisting the twisting handle and forcing a predetermined amount of the liquid solution from the liquid solution holding elongated compartment into the sponge of the sponge tip 700 to spread over the glass screen of one embodiment.

Figure 8A:
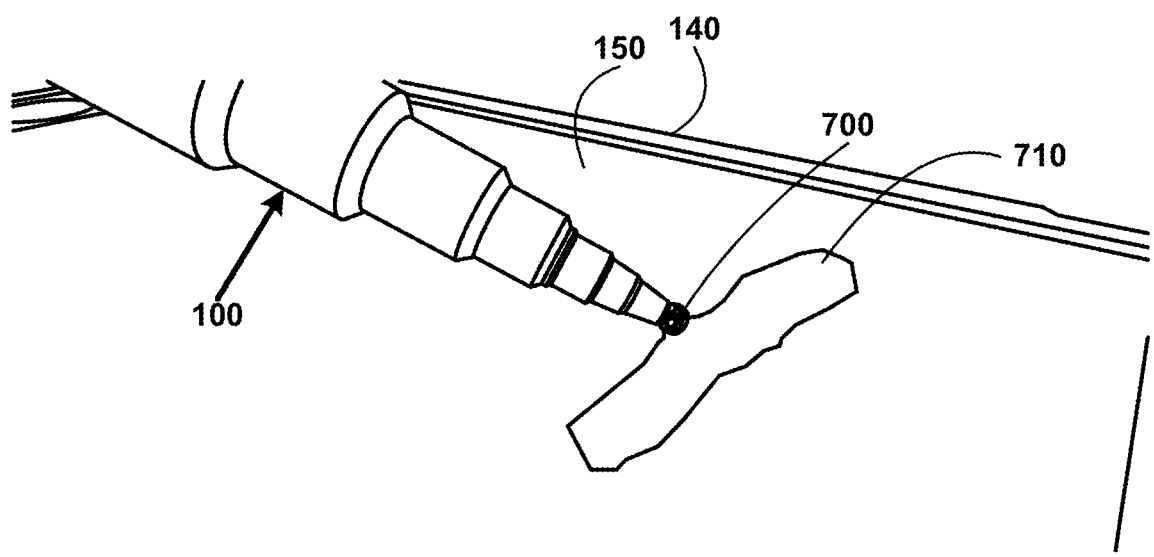
FIG. 8A shows for illustrative purposes only an example of a close-up of the twist pen sponge tip applying the protective liquid of one embodiment.

A Close-Up of the Twist Pen Sponge Tip Applying the Protective Liquid:

FIG. 8A shows for illustrative purposes only an example of a close-up of the twist pen sponge tip applying the protective liquid of one embodiment. FIG. 8A shows the liquid solution twist pen 100 with the sponge tip 700 contacting the user's mobile device glass screen 150 of the user's mobile device 140. In contact with the glass screen, the liquid solution is squeezed from the sponge tip 700 onto the surface. The sponge tip spreads the liquid solution onto the glass screen 710 to create a screen protector of one embodiment.

Figure 8B:
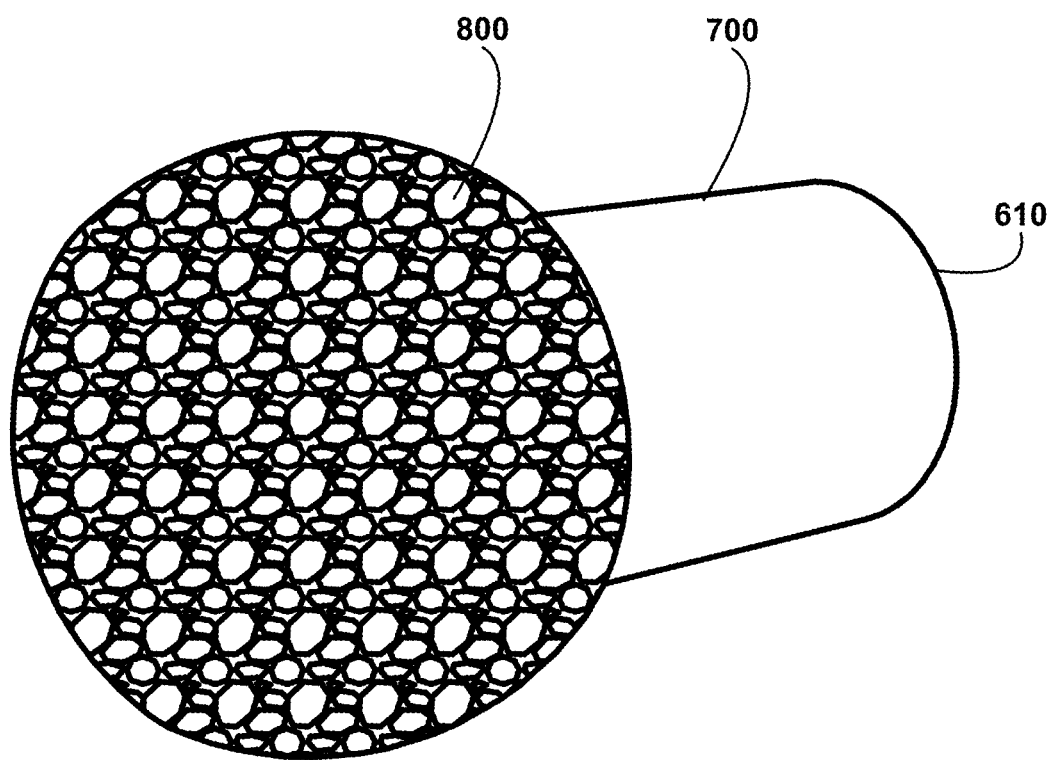
FIG. 8B shows for illustrative purposes only an example of the twist pin sponge tip of one embodiment.

The Twist Pin Sponge Tip:

FIG. 8B shows for illustrative purposes only an example of the twist pin sponge tip of one embodiment. FIG. 8B shows the insertable tip base 610 which is inserted into the open tip orifice. The sponge tip 700 includes a sponge 800 tip end which absorbs dispensed liquid solution from the twist pen 100 of FIG. 1 for spreading onto the glass screen surface of one embodiment.

Figure 9:
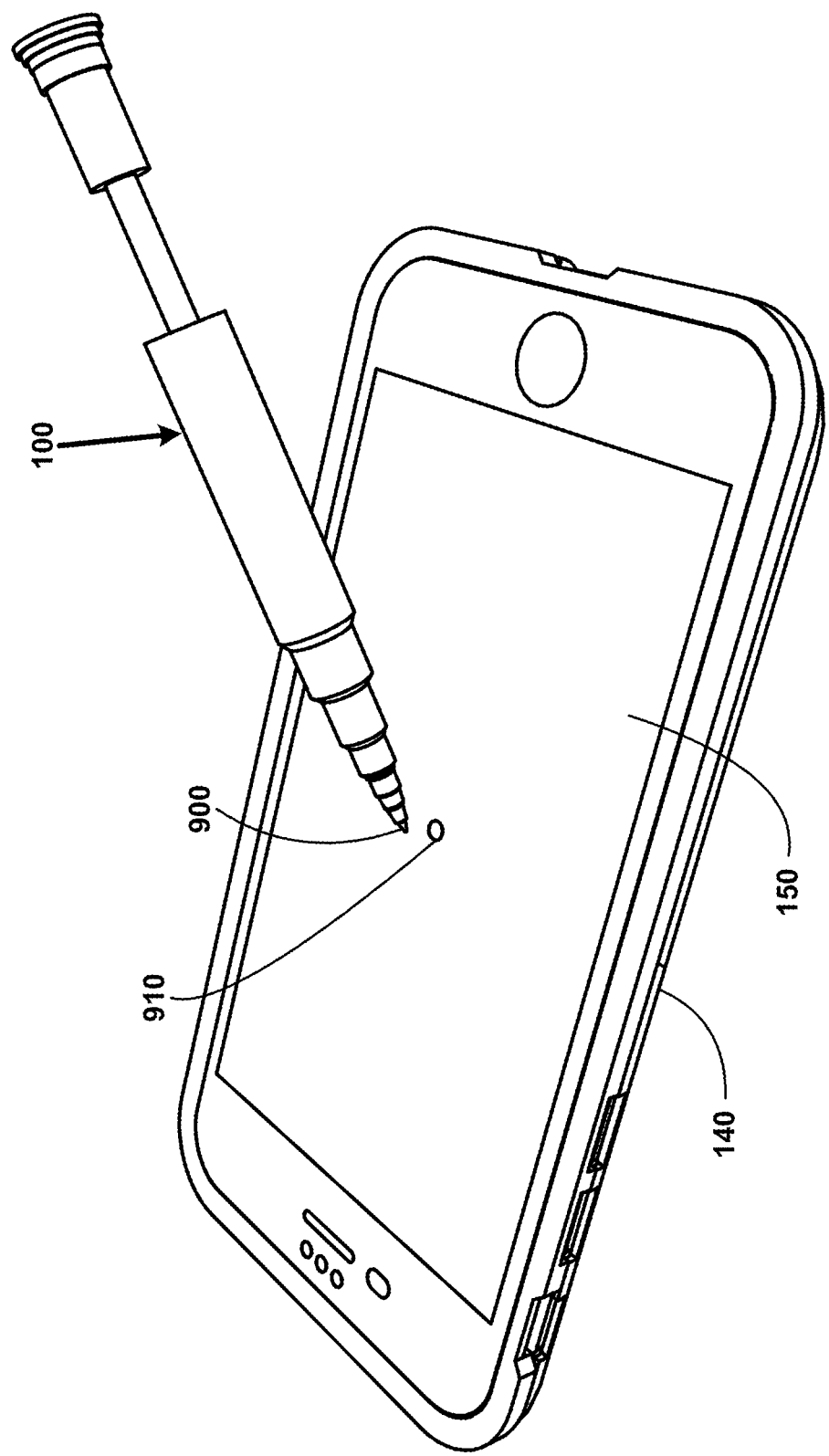
FIG. 9 shows for illustrative purposes only an example of a twist pen drop tip applying the protective liquid of one embodiment.

A Twist Pen Drop Tip Applying the Protective Liquid:

FIG. 9 shows for illustrative purposes only an example of a twist pen drop tip applying the protective liquid of one embodiment. FIG. 9 shows a drop deposited onto the glass screen 910 using a drop tip 900. The drop tip 900 is used to deposit one or more drops of the liquid solution from the liquid solution twist pen 100. One or more drops deposited onto the glass screen 910 are then spread or wiped over the surface of the user's mobile device glass screen 150 of the user's mobile device 140 to apply a screen protection layer onto the glass screen. A drop tip with an insertable tip base configured with a tubular channel to deliver the predetermined amount of the liquid solution out of a drop tip liquid opening in one or more drops onto the glass screen. A drop tip with an insertable tip base configured with a tubular channel to deliver the predetermined amount of the liquid solution out of a drop tip liquid opening in one or more drops onto the glass screen of one embodiment.

Figure 10A:
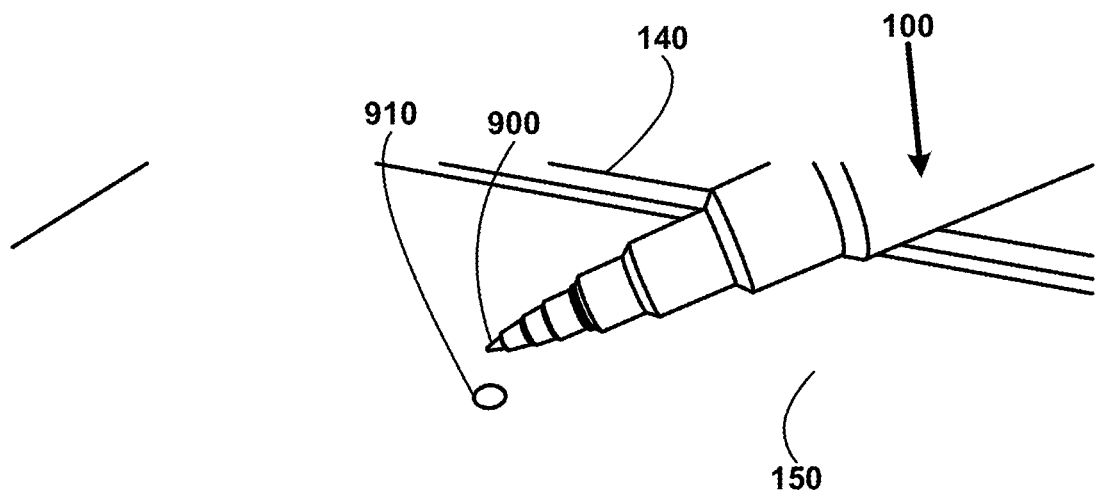
FIG. 10A shows for illustrative purposes only an example of a close-up of the twist pen drop tip applying a drop of the protective liquid of one embodiment.

A Close-Up of the Twist Pen Drop Tip Applying a Drop of the Protective Liquid:

FIG. 10A shows for illustrative purposes only an example of a close-up of the twist pen drop tip applying a drop of the protective liquid of one embodiment. FIG. 10A shows the user's mobile device 140 and the user's mobile device glass screen 150 with the liquid solution twist pen 100 being held over the glass screen. When the user turns the twist-turning handle 110 of FIG. 1 liquid solution flows to the drop tip 900. A drop is deposited onto the glass screen 910. One or more drops are deposited onto the glass screen for spreading over the surface of the glass screen of one embodiment.

Figure 10B:
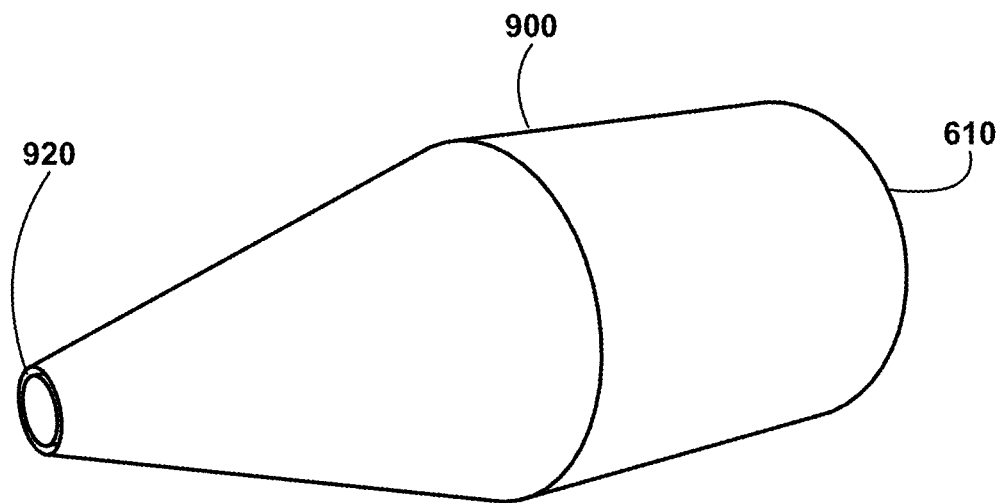
FIG. 10B shows for illustrative purposes only an example of the twist pin drop tip of one embodiment.

The Twist Pin Drop Tip:

FIG. 10B shows for illustrative purposes only an example of the twist pin drop tip of one embodiment. FIG. 10B shows the insertable tip base 610 configured with an open tube running the length of the drop tip 900. The liquid solution flows through the open tube to a drop-tip liquid solution opening 920. The liquid solution is deposited in drops from the drop tip 900 onto the glass surface for spreading across the glass screen. Repeated drop application and subsequent spreading covers the entire surface of the glass screen to form a protective cover and reinforcement of the glass screen to reduce scratching and breakage of one embodiment.

Figure 11:
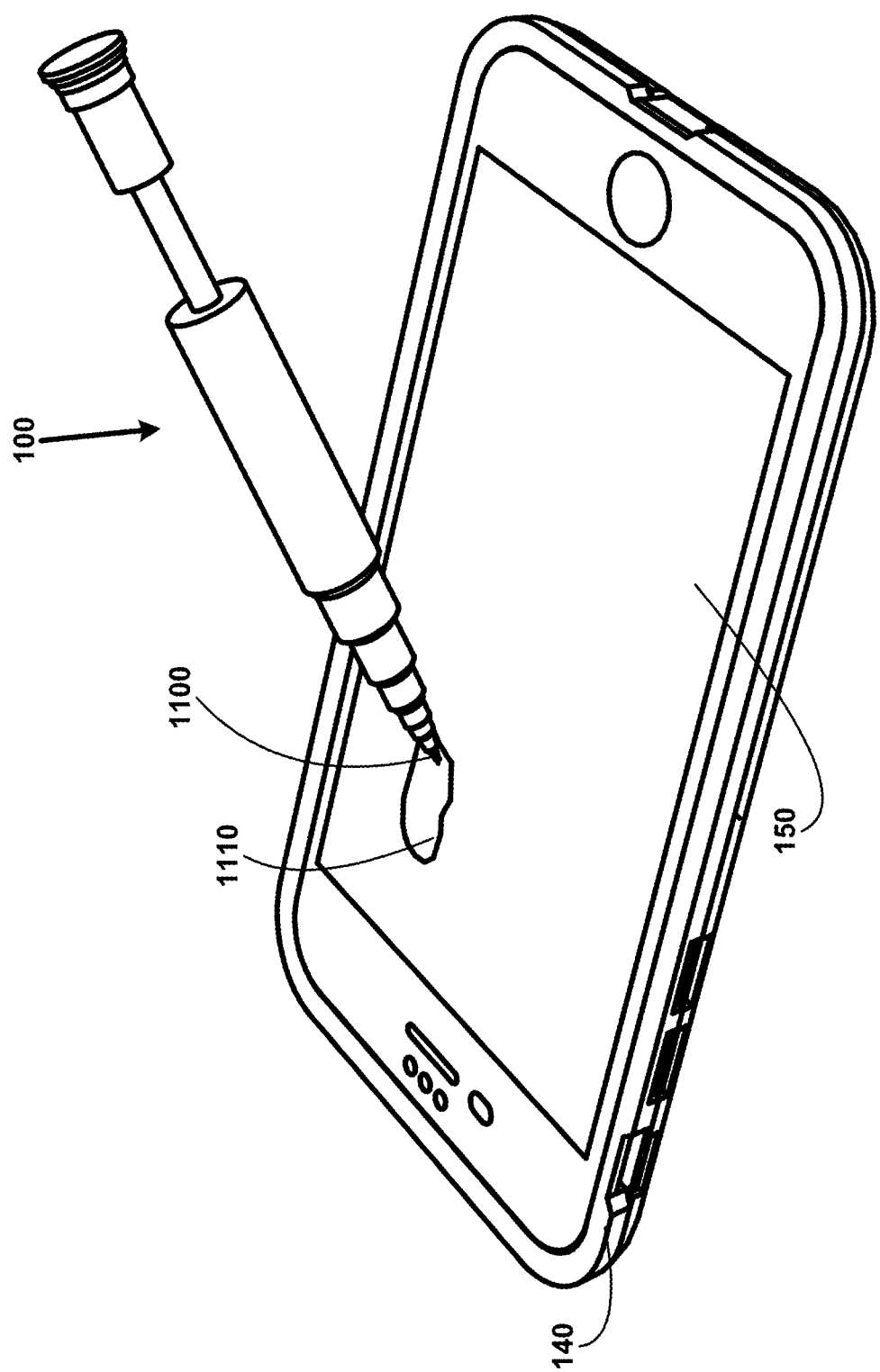
FIG. 11 shows for illustrative purposes only an example of a twist pen spreader tip applying the protective liquid of one embodiment.

A Twist Pen Spreader Tip Applying the Protective Liquid:

FIG. 11 shows for illustrative purposes only an example of a twist pen spreader tip applying the protective liquid of one embodiment. FIG. 11 shows the liquid solution twist pen 100 having an inserted spreader tip 1100. The spreader tip 1100 is used to spread the liquid solution over the user's mobile device glass screen 150 of the user's mobile device 140. A spreader tip applied liquid solution onto the glass screen 1110 creates a screen protector on the user's mobile device glass screen 150 of one embodiment.

Figure 12A:
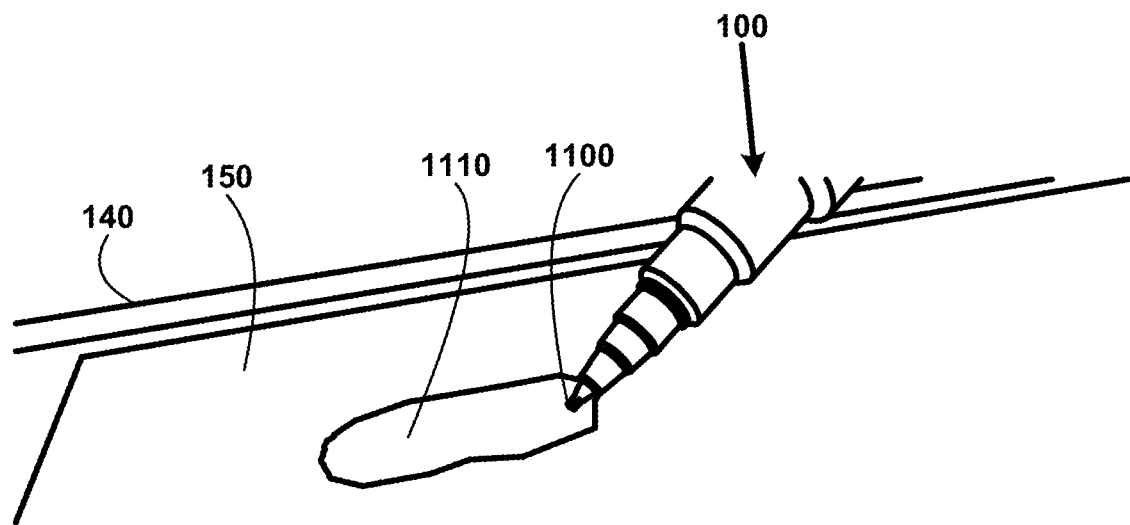
FIG. 12A shows for illustrative purposes only an example of a close-up of the twist pen spreader tip spreading drops of the protective liquid of one embodiment.

A Close-Up of the Twist Pen Spreader Tip Spreading Drops of the Protective Liquid:

FIG. 12A shows for illustrative purposes only an example of a close-up of the twist pen spreader tip spreading drops of the protective liquid of one embodiment. FIG. 12A shows the liquid solution twist pen 100 coupled to the spreader tip 1100. The liquid solution twist pen 100 supplies the liquid solution to the spreader tip 1100 for application to the user's mobile device glass screen 150 of the user's mobile device 140. The glass screen acquires added protection with a spreader tip applied liquid solution onto the glass screen 1110 of one embodiment.

Figure 12B:
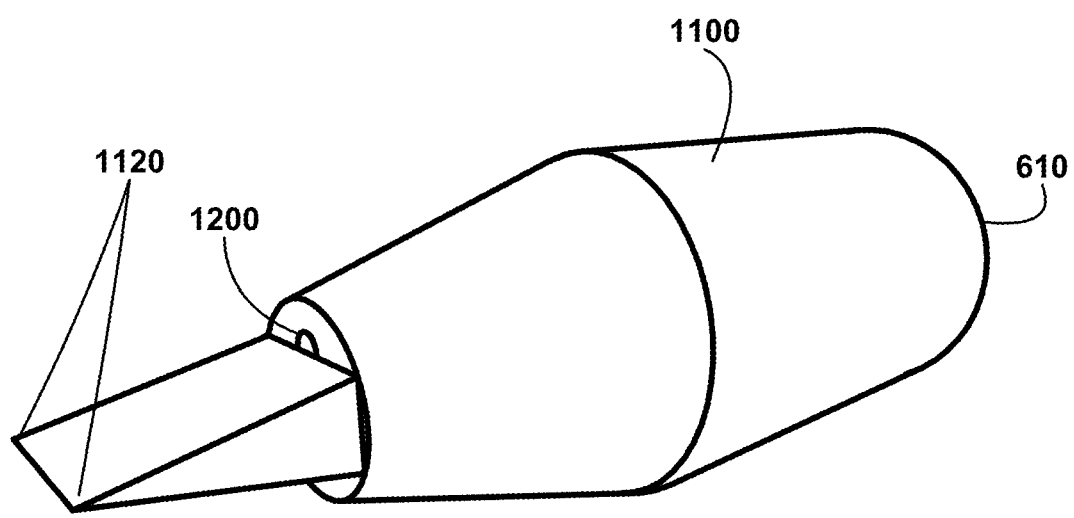
FIG. 12B shows for illustrative purposes only an example of the twist pin spreader tip of one embodiment.

The Twist Pin Spreader Tip:

FIG. 12B shows for illustrative purposes only an example of the twist pin spreader tip of one embodiment. FIG. 12B shows the spreader tip 1100 integrated with the insertable tip base 610 for extending a flow tube to supply liquid solution from the liquid solution twist pen 100 of FIG. 1. A spreader tip flared end is used to spread drops of liquid solution deposited onto the glass screen 1120 from a dispensing hole 1200 over the entire glass screen surface of one embodiment.

Figure 13:
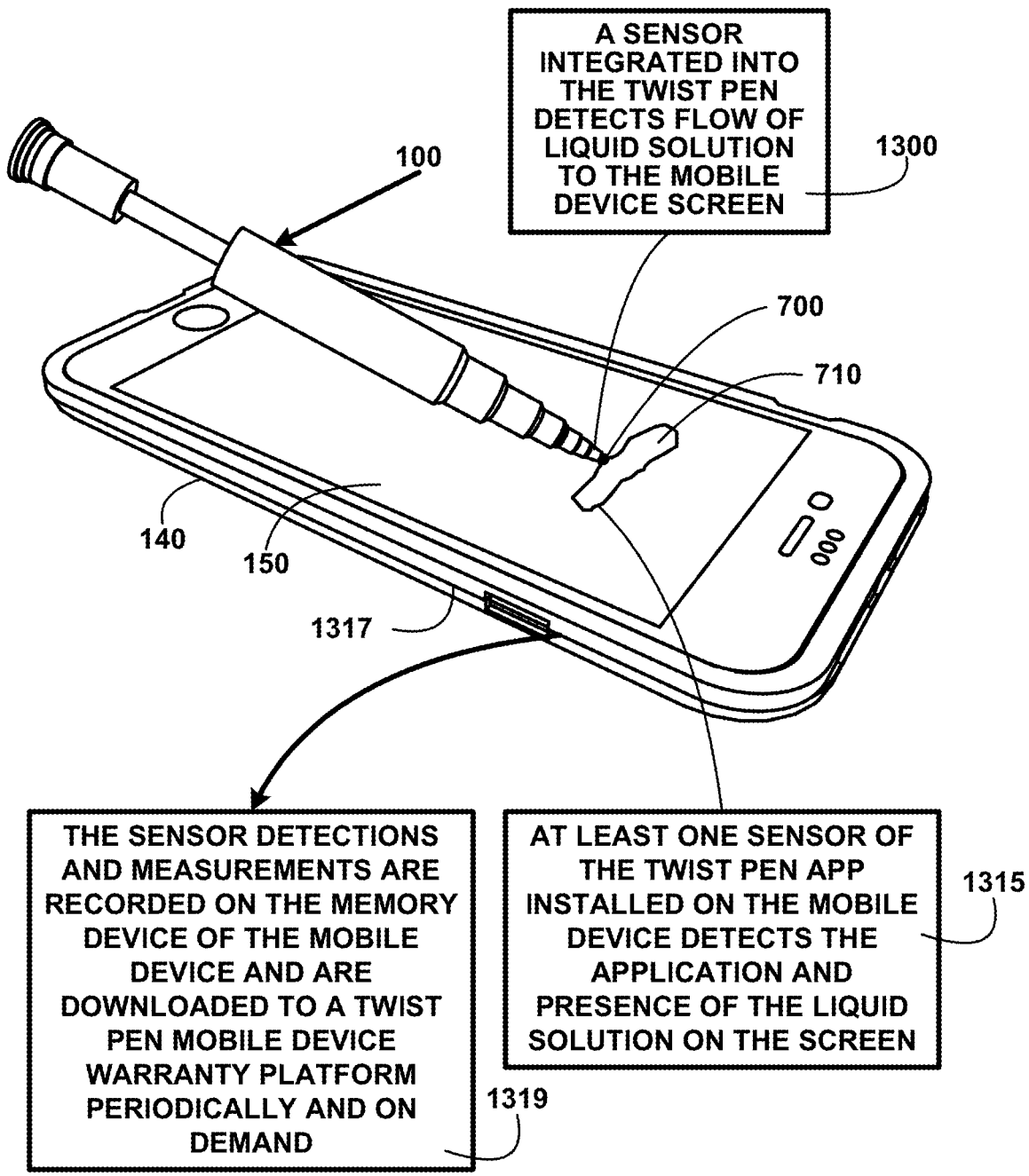
FIG. 13 shows for illustrative purposes only an example of the twist pen liquid application sensors of one embodiment.

Twist Pen Liquid Solution Application Sensors:

FIG. 13 shows for illustrative purposes only an example of twist pen liquid application sensors of one embodiment. FIG. 13 shows the liquid solution twist pen 100 having an inserted sponge tip 700. The sponge tip to spread the liquid solution onto the glass screen 710 of the user's mobile device 140. The liquid solution makes physical contact with the user's mobile device glass screen 150 and then pressure is applied in the spreading action. A sensor integrated into the twist pen detects the flow of the liquid solution to the mobile device screen 1300. At least one sensor of the twist pen app installed on the mobile device detects the application pressure and physical presence of the liquid solution on the screen 1315. At least one electronic device to convert sensor detection signals into digital data 1317.

Sensor detection of conditions affecting the user's mobile device is used to detect and measure the orientation, dropping and other movement, forces applied to the mobile device, chemicals coming in contact with the mobile device, temperature changes, and other external conditions that cause damage to the mobile device. The sensor detections and measurements are recorded on the memory device of the mobile device and are downloaded to a twist pen mobile device warranty platform periodically and on demand 1319.

Various sensors are included in at least one sensor of the twist pen app. The various sensors optionally are Flow Sensors/Detectors are electronic or electro-mechanical devices used to sense the movement of gases, liquids, or solids and provide signals to the inputs of control or display devices. A flow sensor can be all electronic—using ultrasonic detection from outside a pipeline, or Motion Sensors/Detectors/Transducers are electronic devices that can sense the movement or stoppage of parts, people, etc., and supply signals to the inputs of control or display devices. Typical applications of motion detection are detecting the movement of equipment and materials, or, Gas and Chemical Sensors/Detectors are fixed, or portable electronic devices used to sense the presence and properties of various gases or chemicals and relay signals to the inputs of controllers or visual displays, or Force Sensors/Transducers are electronic devices that measure various parameters related to forces such as weight, torque, load, etc. and provide signals to the inputs of control or display devices. A force sensor typically relies on a load cell, a piezoelectric device whose resistance changes under deforming loads including the forces applied during the spreading of the liquid solution on the mobile device glass screen, or Vision and Imaging Sensors/Detectors are electronic devices that detect the presence of objects or colors within their fields of view and convert this information into a visual image for display, or, Temperature Sensors/Detectors/Transducers are electronic devices that detect thermal parameters and provide signals to the inputs of control and display devices, or, Radiation Sensors/Detectors are electronic devices that sense the presence of alpha, beta, or gamma particles and provide signals to counters and display devices, or, Proximity Sensors are electronic devices used to detect the presence of nearby objects through non-contacting means, or, Pressure Sensors/Detectors/Transducers are electro-mechanical devices that detect forces per unit area in gases or liquids and provide signals to the inputs of control and display devices, or, Position Sensors/Detectors/Transducers are electronic devices used to sense the positions of valves, doors, throttles, etc., and supply signals to the inputs of control or display devices, or, Photoelectric sensors are electrical devices that sense objects passing within their field of detection, although they are also capable of detecting color, cleanliness, and location if needed, or, Particle Sensors/Detectors are electronic devices used to sense dust and other airborne particulates and supply signals to the inputs of control or display devices, or, Motion Sensors/Detectors/Transducers are electronic devices that can sense the movement or stoppage of parts, people, etc. and supply signals to the inputs of control or display devices, or, Metal Detectors are electronic or electro-mechanical devices used to sense the presence of metal in a variety of situations ranging from packages to people, or, Level Sensors/Detectors are electronic or electro-mechanical devices used for determining the height of gases, liquids, or solids in tanks or bins and providing signals to the inputs of control or display devices, or, Leak Sensors/Detectors are electronic devices used for identifying or monitoring the unwanted discharge of liquids or gases, or, Humidity Sensors/Detectors/Transducers are electronic devices that measure the amount of water in the air and convert these measurements into signals that can be used as inputs to control or display devices, or, Gas and Chemical Sensors/Detectors are fixed, or portable electronic devices used to sense the presence and properties of various gases or chemicals and relay signals to the inputs of controllers or visual displays, or Force Sensors/Transducers are electronic devices that measure various parameters related to forces such as weight, torque, load, etc. and provide signals to the inputs of control or display devices. A force sensor typically relies on a load cell, a piezoelectric device whose resistance changes under deforming loads, or, Flow Sensors/Detectors are electronic or electro-mechanical devices used to sense the movement of gases, liquids, or solids and provide signals to the inputs of control or display devices, or, Flame Detectors are optoelectronic devices used to sense the presence and quality of fire and provide signals to the inputs of control devices, or, Electrical Sensors/Detectors/Transducers are electronic devices that sense current, voltage, etc., and provide signals to the inputs of control devices or visual displays, or, Non-contact sensors are devices that do not require a physical touch between the sensor and the object being monitored to function, or, Infrared sensors use infrared light in various forms. Some detect the infrared radiation emitted by all objects.

Others cast infrared beams that are reflected back to sensors that look for interruptions of the beams, or Temperature sensors generally rely on RTDs or thermistors to sense changes in temperature through the change in electrical resistance that occurs in materials, or, non-contacting proximity sensors often use hall effect phenomena, eddy currents, or capacitive effects to detect the nearness of conductive metals. Other methods are used as well, including optical and laser. Where proximity sensors can be used to detect small changes in the positions of targets, simple on/off proximity switches use the same methods to detect, for instance, an open door, or, Ultrasonic sensors measure the time between the emission and reception of ultrasonic waves to determine the distance to a tank's contents, for example. In another form, ultrasonic sensors detect the ultrasonic energy emitted by leaking air, etc., or Force and pressure sensors typically use strain gages or piezoelectric devices which change their resistance characteristics under applied loads. These changes can be calibrated over the linear ranges of the transducers to produce measures of weight (force) or pressure (force per unit area), or, Vision sensors typically rely on CCD, infrared, or ultraviolet cameras to produce images that can be interpreted by software systems to detect flaws, sense barcodes, etc., or, Encoders are electromechanical devices that are used to convert linear or rotary motions to analog or digital output signals, or, Load Cells are mechanical or electronic devices designed to convert forces, either compressive, tensile, torsional, or shear, into electrical signals, or, Monitors are typically electronic devices used to remotely or conveniently view information as required of one embodiment.

Figure 14:
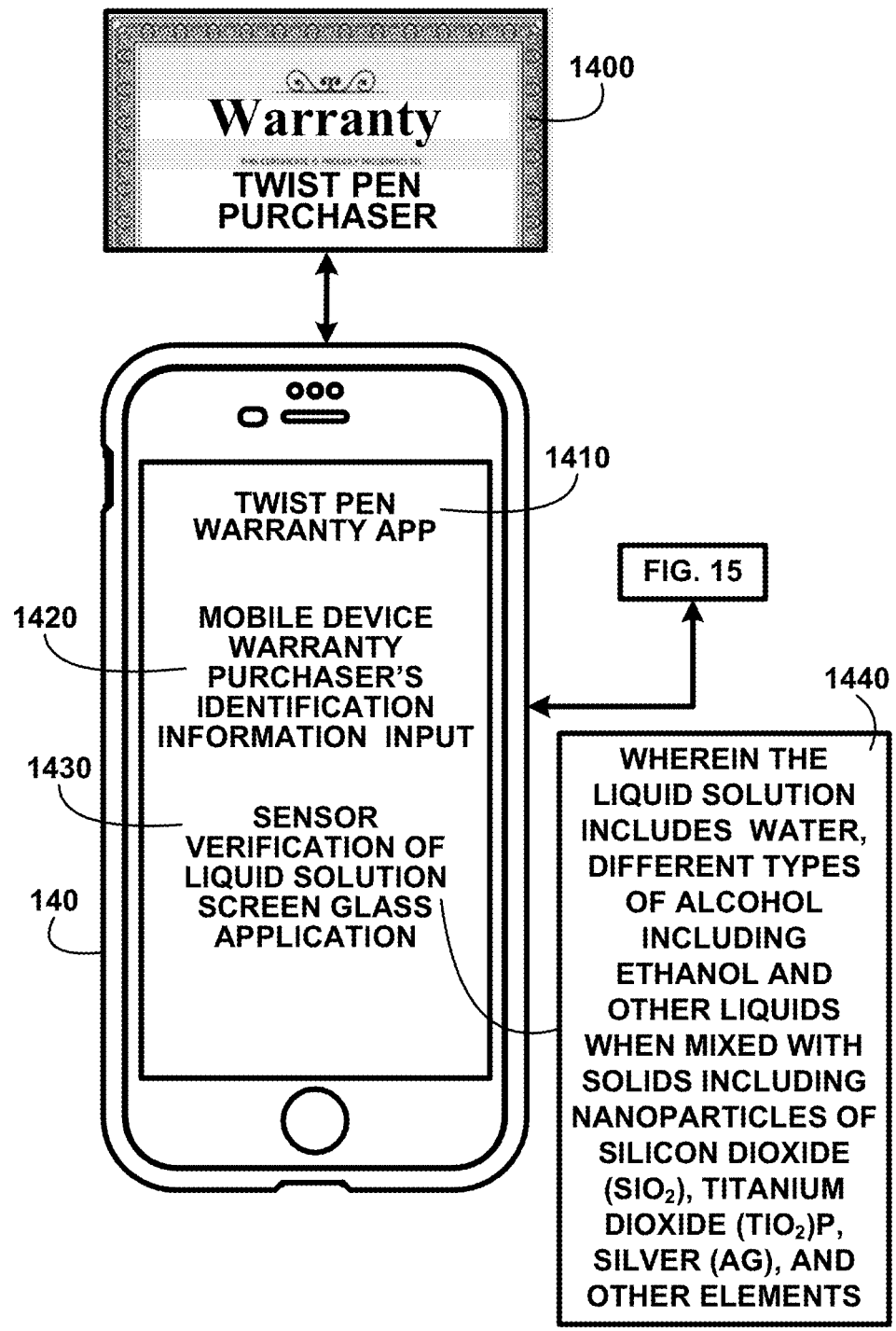
FIG. 14 shows for illustrative purposes only an example of a twist pen warranty purchase of one embodiment.

Twist Pen Warranty Purchase:

FIG. 14 shows for illustrative purposes only an example of a twist pen warranty purchase of one embodiment. FIG. 14 shows a warranty purchase by a twist pen purchaser 1400. The user mobile device 140 has a twist pen warranty app 1410 for registering purchasers of at least one warranty plan for financially protecting a mobile device owner from the damage of a twist pen screen protector, mobile device screen, and optionally other mobile device components. The twist pen warranty app 1410 receives the mobile device warranty purchaser's identification information input 1420. Sensor verification of liquid solution application 1430 is recorded to assure the twist pen liquid solution application has been completed. Wherein the liquid solution includes water, different types of alcohol including ethanol, and other liquids when mixed with solids including nanoparticles of silicon dioxide (SiO2), titanium dioxide (TiO2)p, Silver (AG), and other elements 1440 of one embodiment. Descriptions continue in FIG. 15.

Figure 15:
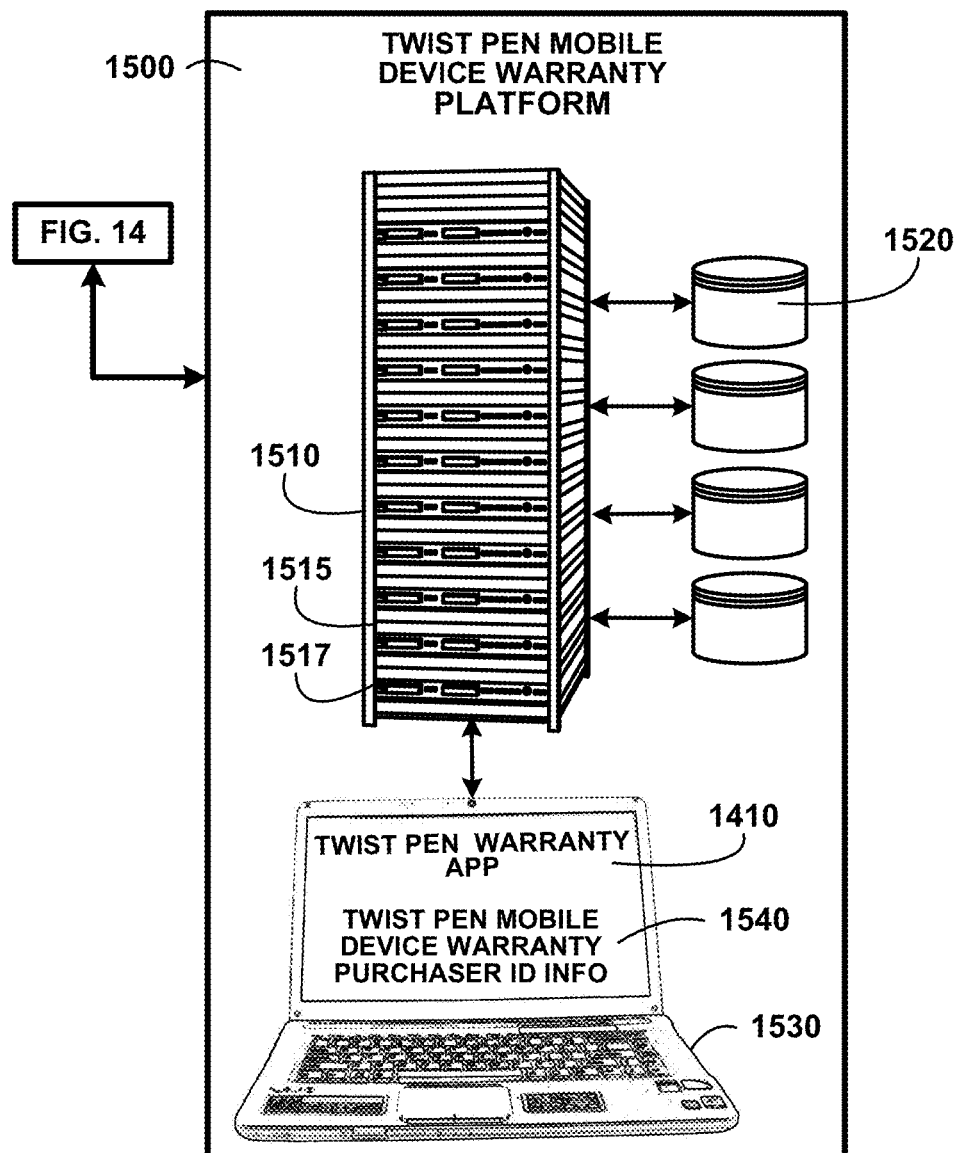
FIG. 15 shows for illustrative purposes only an example of a twist pen mobile device warranty platform of one embodiment.

Twist Pen Mobile Device Warranty Platform:

FIG. 15 shows for illustrative purposes only an example of a twist pen mobile device warranty platform of one embodiment. FIG. 15 shows a continuation from FIG. 14. FIG. 15 shows a twist pen mobile device warranty platform 1500 including a plurality of servers 1510, a plurality of processors 1515, at least one electronic device to convert sensor detection signals into digital data 1517, a plurality of databases 1520, and a platform computer 1530 with the twist pen warranty app 1410 installed.

The platform computer 1530 displays twist pen mobile device warranty purchaser ID info 1540. The twist pen mobile device warranty platform 1500 is configured for receiving damage claims for at least one warranty plan coverage for different types of phone cases including non-foldable and foldable mobile devices that have verified complete twist pen applied screen protectors of one embodiment.

Figure 16:
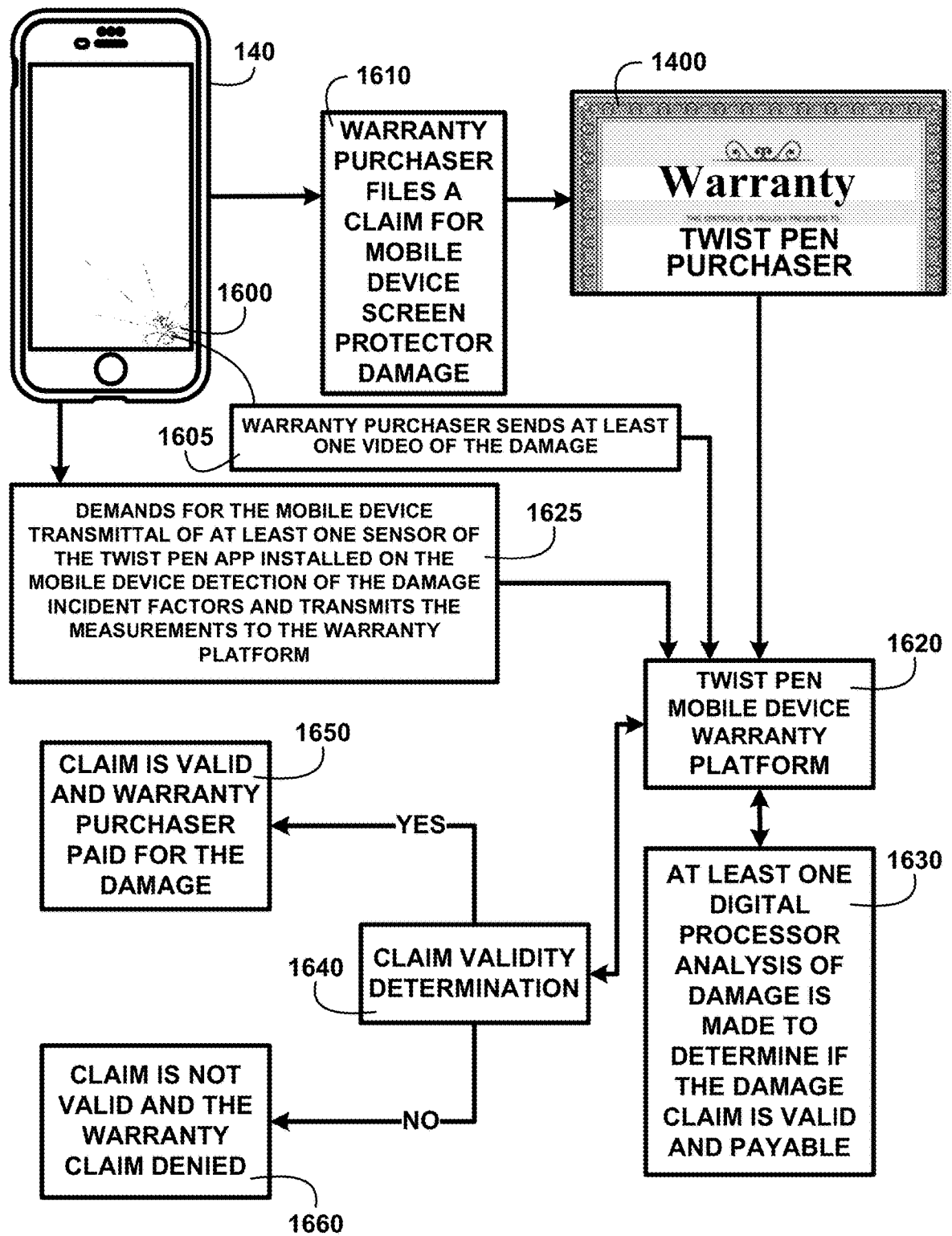
FIG. 16 shows for illustrative purposes only an example of a twist pen warranty claim of one embodiment.

Twist Pen Warranty Claim:

FIG. 16 shows for illustrative purposes only an example of a twist pen warranty claim of one embodiment. FIG. 16 shows the user's mobile device 140 with mobile device screen damage 1600. A warranty purchaser files a claim for mobile device screen protector damage 1610. A video recording of the application of the liquid solution onto the glass screen is used to authenticate the application to activate a warranty policy. The warranty purchaser sends at least one video of the damage 1605 while the IMEI or SERIAL number is displayed on the screen to verify the device. In the transmission of the damage claim, the IP address of the mobile device is captured and verified as the mobile device covered by the warranty purchase by a twist pen purchaser 1400.

The twist pen mobile device warranty platform 1620 demands the mobile device transmittal of at least one sensor of the twist pen app installed on the mobile device detection of the damage incident factors and transmits the measurements to the warranty platform 1625. At least one digital processor analysis of damage is made to determine if the damage claim is valid and payable 1630. At least one digital processor analysis of damage is used to make a claim validity determination 1640. If the claim validity determination is yes, then the claim is valid and the warranty purchaser paid for the damage 1650.

If the claim validity determination is no, then the claim is not valid and the warranty claim is denied 1660. The warranty damage claims include the processor analysis of the mobile device sensor. For example, every smartphone has a 3-dimensional coordinate system. Based on this system, sensors in your smartphone detect and record changes in real time. Motion sensors detect the movement, acceleration, and rotation along the three axes of the device's coordinate system. Some examples of motion sensors are accelerometers, gravity sensors, and gyroscopes. An accelerometer records the movement of your device along the three axes of the coordinate system. The X-axis measures the movement of your device from side to side, the Y-axis measures the movement along the top and bottom (including gravity), and the Z-axis measures the movement forward and backward.

A gyroscope measures the rotation along the three axes of the device's coordinate system. It detects the exact measure of your phone's rotation in radians per second. Position sensors record the physical location of the device. They do this by identifying your phone's coordinates—taking the world around them as a frame of reference and its orientation in 3-dimensional space. Phones use them for navigation, detecting screen orientation, and much more. Examples of position sensors are proximity sensors, GPS, and magnetometers.

A magnetometer senses your phone's orientation according to the earth's magnetic field. This sensor is essential to navigation and compass apps as it helps your phone identify directions and adjust the map accordingly. A Global Positioning System (GPS) is a sensor with antennas to help with navigation. It receives continuous signals from satellites that help calculate the distance traveled and the location of your phone. Environmental sensors detect any significant changes in the surroundings of your smartphone. For example, these include changes in the lighting, pressure, and temperature; adjusting the brightness when the auto-brightness is enabled, displaying temperature, measuring air pressure, and more. Examples of environmental sensors are ambient light sensors, thermometers, barometers, air-humidity sensors, etc.

Ambient light sensors measure the intensity of light around the device. These sensors detect the changes in brightness of the surroundings and record their intensity. Proximity sensors detect how close a certain object is to your phone. A quick example of this is your phone's display turning off when you pick up and answer a call. This helps save battery life and avoids accidental taps during phone calls. A Hall sensor is quite similar to a proximity sensor, except it detects changes in the magnetic fields around the device. When it senses a change in the magnetic field, it sends this data to the processor, turning off the phone's display. This sensor is specifically used to detect the magnets in flip covers. In this example, proximity sensors work by measuring the distance between the screen and your ear, and when the distance equals a set value, it turns off the display before your ear touches the screen.

Biometric sensors use physical attributes for identification and are typically used for security purposes. As physical features like fingerprints, irises, and faces are unique to a person, using them for identity authentication provides enhanced protection. Some of the biometric sensors are Fingerprint Scanners and Iris sensors. Atmospheric sensors detect several aspects of your device's surroundings like atmospheric pressure, ambient temperature, air humidity, etc. Atmospheric sensors include a Thermometer, Barometer, and Air humidity sensors of one embodiment.

Figure 17A:
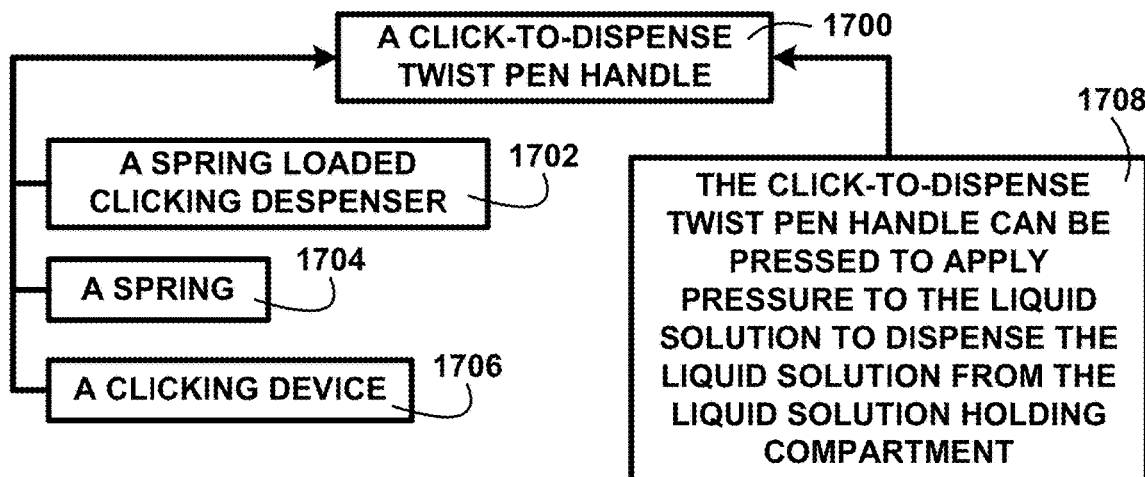
FIG. 17A shows a block diagram of an overview of a click-to-dispense twist pen of one embodiment.

A Click-to-Dispense Twist Pen:

FIG. 17A shows a block diagram of an overview of a click-to-dispense twist pen of one embodiment. FIG. 17A shows a click-to-dispense twist pen handle 1700. The click-to-dispense twist pen handle 1700 includes a spring-loaded clicking dispenser 1702. The spring-loaded clicking dispenser 1702 includes a spring 1704 and a clicking device 1706. The click-to-dispense twist pen handle can be pressed to apply pressure to the liquid solution to dispense the liquid solution from the liquid solution holding elongated compartment 1708. The spring 1704 is compressed when the handle is pressed and clicks and when released, the spring 1704 retracts the handle.

A dispenser app operating on a user's mobile device configured to automatically record video of an application of the liquid solution onto the glass screen when the tip makes contact with the glass screen. The dispenser app is configured to display directions to a user on applying the liquid solution to the glass screen in a predetermined sequence. the dispenser app operating on the user automatically recognizes the tip when it contacts the glass screen and displays directions for the application of the liquid solution including starting the tip application at a particular section of the glass screen and making the application in a certain direction and following a path to cover the entire glass screen surface of one embodiment.

Figure 17B:
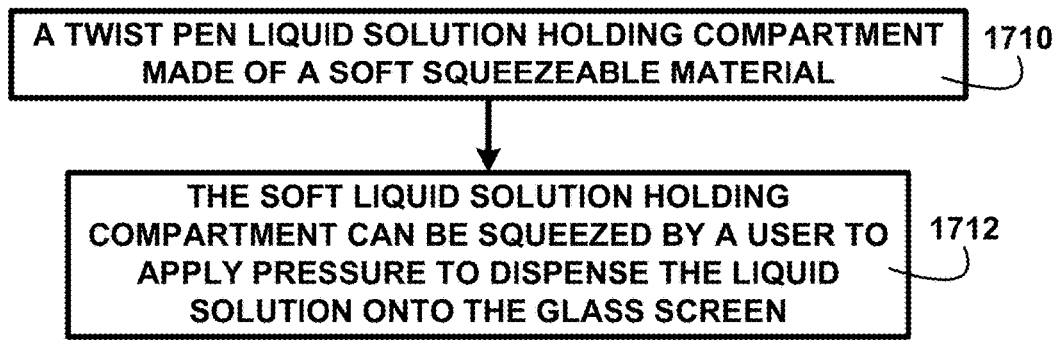
FIG. 17B shows for illustrative purposes only an example of a squeezable soft tube pen of one embodiment.

A Squeezable Soft Tube Pen:

FIG. 17B shows for illustrative purposes only an example of a squeezable soft tube pen of one embodiment. FIG. 17B shows a twist pen liquid solution holding elongated compartment made of a soft squeezable material 1710 the soft liquid solution holding elongated compartment can be squeezed by a user to apply pressure to dispense the liquid solution onto the glass screen 1712 of one embodiment.

Figure 17C:
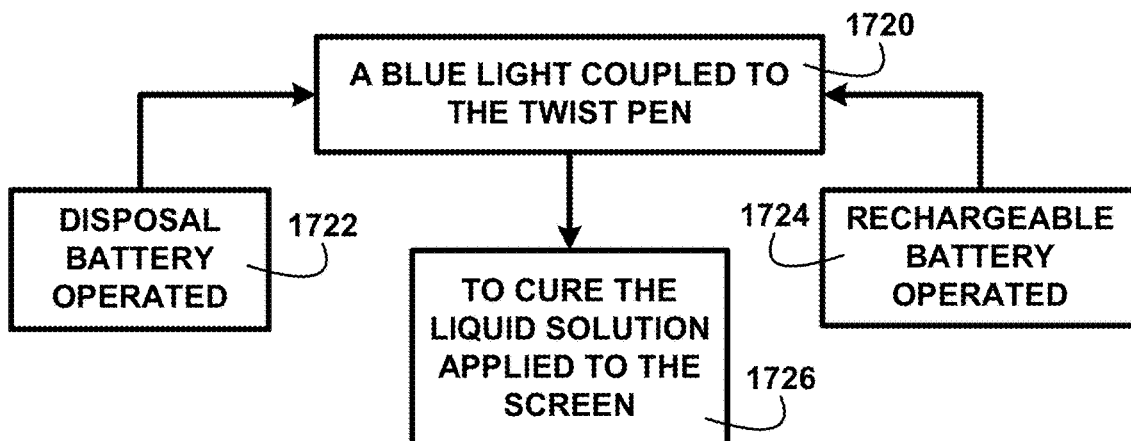
FIG. 17C shows for illustrative purposes only an example of a liquid curing blue light of one embodiment.

A Liquid Curing Blue Light:

FIG. 17C shows for illustrative purposes only an example of a liquid curing blue light of one embodiment. FIG. 17C shows a blue light coupled to the twist pen 1720. The blue light can be disposable battery-operated 1722 and in another embodiment, a rechargeable battery-operated 1724. The blue light is used to cure the liquid solution applied to the screen 1726 of one embodiment.

Figure 18A:
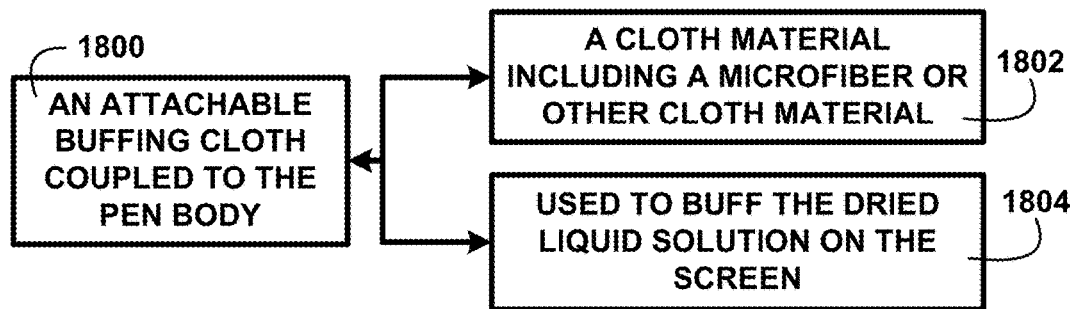
FIG. 18A shows for illustrative purposes only an example of an attachable buffing cloth of one embodiment.

An Attachable Buffing Cloth:

FIG. 18A shows for illustrative purposes only an example of an attachable buffing cloth of one embodiment. FIG. 18A shows an attachable buffing cloth coupled to the pen body 1800. A cloth material including a microfiber or other cloth material 1802 is used to buff the dried liquid solution on the screen 1804 of one embodiment.

Figure 18B:
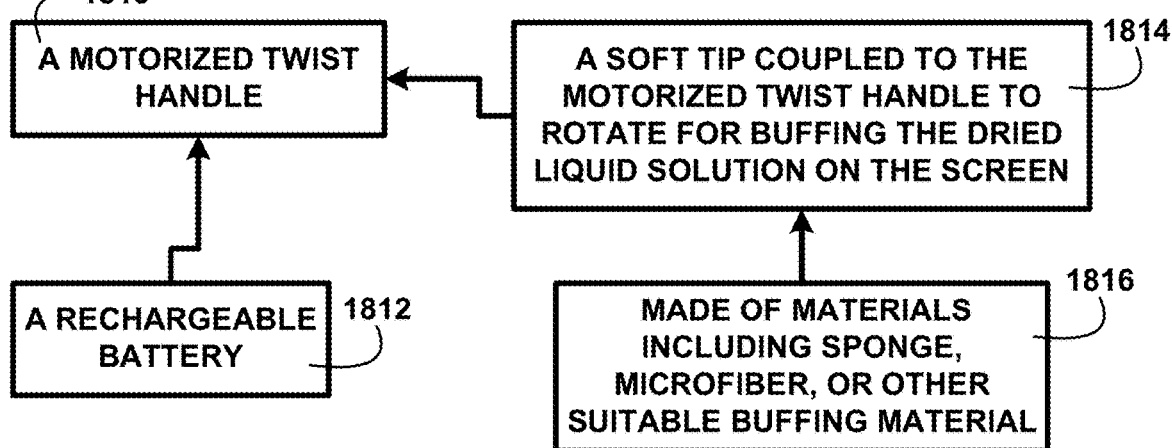
FIG. 18B shows for illustrative purposes only an example of a rotating buffer handle of one embodiment.

A Rotating Buffer Handle:

FIG. 18B shows for illustrative purposes only an example of a rotating buffer handle of one embodiment. FIG. 18B shows a motorized twist handle 1810 powered by a rechargeable battery 1812. A soft tip coupled to the motorized twist handle to rotate for buffing the dried liquid solution on the screen 1814. The soft tip is made of materials including sponge, microfiber, or other suitable buffing material 1816 of one embodiment.

Figure 18C:
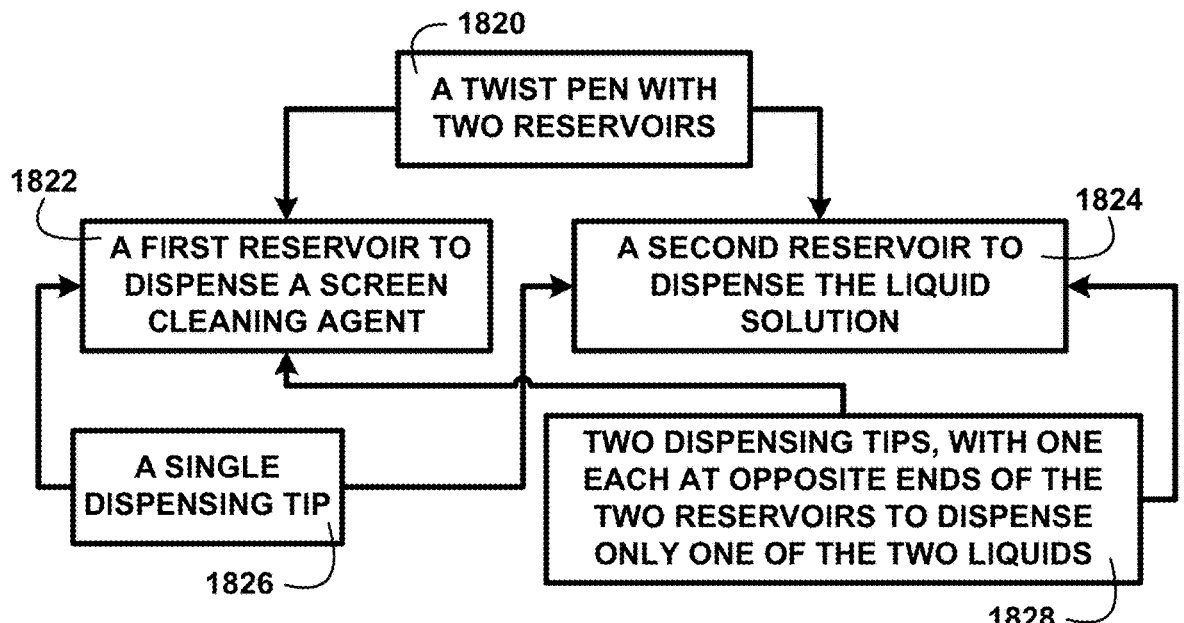
FIG. 18C shows for illustrative purposes only an example of a two-reservoir pen compartment of one embodiment.

A Two-Reservoir Pen Compartment:

FIG. 18C shows for illustrative purposes only an example of a two-reservoir pen compartment of one embodiment. FIG. 18C shows a twist pen with two reservoirs 1820. A first reservoir to dispense a screen cleaning agent 1822. A second reservoir to dispense the liquid solution 1824. The two reservoir liquid solutions can be dispensed to a single dispensing tip 1826. In another embodiment, the reservoirs are dispensed through two dispensing tips, with one each at opposite ends of the two reservoirs to dispense only one of the two liquids 1828 of one embodiment.

The foregoing has described the principles, embodiments, and modes of operation of the present invention. However, the invention should not be construed as being limited to the particular embodiments discussed. The above-described embodiments should be regarded as illustrative rather than restrictive, and it should be appreciated that variations may be made in those embodiments by workers skilled in the art without departing from the scope of the present invention as defined by the following claims.

What is claimed is:

1. An apparatus, comprising:
a dispenser elongated chamber having a liquid solution of silicon dioxide contained within the dispenser elongated chamber;
wherein the liquid solution of silicon dioxide contained in the dispenser elongated chamber comprises a plurality of solid silicon dioxide nanoparticles suspended in an evaporative liquid;
a twist-turning handle coupled to the dispenser elongated chamber configured to be twisted by fingers of a user to push a predetermined amount of the liquid solution of silicon dioxide out of the dispenser elongated chamber through an open tip orifice;
an applicator brush tip connected to the open tip orifice configured to receive the predetermined amount of the liquid solution of silicon dioxide; and
wherein the applicator brush tip is configured to apply the predetermined amount of the liquid solution of silicon dioxide onto a mobile device glass screen to create a scratch resistant screen protector coating.

2. The apparatus of claim 1, wherein the applicator brush tip is configured to be insertable into the open tip orifice and further configured to be removable from the open tip orifice.

3. The apparatus of claim 1, wherein the applicator brush tip has an insertable tip base having a plurality of brush fibers configured to receive the liquid solution of silicon dioxide into the applicator brush tip to spread the liquid solution of silicon dioxide onto the mobile device glass screen of the user.

4. The apparatus of claim 1, wherein the liquid solution of silicon dioxide is silicon dioxide ($SiO_2$) nanoparticles suspended in a quickly evaporating ethanol alcohol.

* * * * *